(12) United States Patent
Watanabe et al.

(10) Patent No.: US 7,027,884 B2
(45) Date of Patent: Apr. 11, 2006

(54) METHOD OF PRODUCTION CONTROL AND METHOD OF MANUFACTURING INDUSTRIAL PRODUCTS

(75) Inventors: Kazuhiro Watanabe, Kawasaki (JP); Yuuichi Kubo, Kawasaki (JP); Yuichiro Ohta, Kawasaki (JP); Masaru Kitano, Kawasaki (JP); Mitsuaki Sugine, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/092,131

(22) Filed: Mar. 29, 2005

(65) Prior Publication Data

US 2006/0025877 A1    Feb. 2, 2006

(30) Foreign Application Priority Data

Mar. 30, 2004 (JP) ............................. 2004-099089
Aug. 18, 2004 (JP) ............................. 2004-238595

(51) Int. Cl.
*G06F 19/00* (2006.01)

(52) U.S. Cl. ......................... 700/97; 700/95; 700/106; 700/111

(58) Field of Classification Search ................ 700/95, 700/97, 99, 106, 108, 109, 111; 705/22, 705/28
See application file for complete search history.

(56) References Cited

U.S. PATENT DOCUMENTS

| 6,311,094 | B1 * | 10/2001 | Iriuchijima et al. ......... 700/100 |
| 2003/0182008 | A1 * | 9/2003 | Watanabe et al. ............ 700/99 |
| 2005/0021164 | A1 * | 1/2005 | Surholt et al. .............. 700/106 |

FOREIGN PATENT DOCUMENTS

| JP | 08-025191 | 1/1996 |
| JP | 2001-273021 | 10/2001 |
| JP | 2001-273023 | 10/2001 |
| JP | 2002-244708 | 8/2002 |
| JP | 2004-152052 | 5/2004 |

OTHER PUBLICATIONS

"A Dictionary for Production Management"; Nippon Jitsugyo Publishing Co., Ltd.; Editors: Tadami Sugamata and Kazunari Tanaka; p. 301, "Kanban System"; Mar. 20, 1986.

* cited by examiner

*Primary Examiner*—Leo Picard
*Assistant Examiner*—Charles Kasenge
(74) *Attorney, Agent, or Firm*—Greer, Burns & Crain, Ltd.

(57) ABSTRACT

The invention relates to a method of production control and a method of manufacturing industrial products. It is an object of the invention to provide a method of production control and a method of manufacturing industrial products which make it possible to set a target processing quantity of a process appropriately set and to improve the throughput of a production line as a whole. A method of production control for a production line including a plurality of processes is provided, in which a target processing quantity $Lk$ for a process $Pk$ is obtained from:

$$Lk=Nk-SKk(Nk>SKk)$$

$$Lk=0(Nk \leq SKk)$$

where the processes are represented by $Pn$ ($n=1, 2, \ldots, k-1, k, \ldots$) in the order of their closeness to warehousing; $Nk$ represents a total quantity scheduled to be warehoused from a day as a starting point until after lead time $Tk$ from the process $Pk$ up to the warehousing passes; and $SKk$ represents an expected cumulative quantity completed, which will contribute to the warehousing, among work in process which has passed through the process $Pk$.

22 Claims, 20 Drawing Sheets

FIG. 3

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) B TARGET PROCESSING QUANTITY L1b FOR P1 | 200 | 200 | 0 | 0 | 200 | 200 | 0 | 0 |
| (2) B WORK-IN-PROCESS QUANTITY S(1~2)b AT P1~P2 | 250 | 200 | 0 | 0 | 200 | 200 | 0 | 0 |
| QUANTITY OF B REQUIRED TO BE PROCESSED AT P3 | 150 | 0 | 200 | 200 | 200 | 0 | | |
| LEAD TIME: ONE DAY, YIELD: 100 % | | | | | | | | |
| (3) B TARGET PROCESSING QUANTITY L3b FOR P3 | 150 | 0 | 0 | 200 | 200 | 0 | 0 | |
| (4) B WORK-IN-PROCESS QUANTITY S(3~5)b AT P3~P5 | 150 | 0 | 0 | 200 | 200 | 0 | 0 | |
| QUANTITY OF B REQUIRED TO BE PROCESSED AT P6 | 0 | 0 | 200 | 200 | 0 | 0 | | |
| LEAD TIME: TWO DAYS, YIELD: 100 % | | | | | | | | |
| (5) B TARGET PROCESSING QUANTITY L6b FOR P6 | 0 | 0 | 200 | 200 | 0 | 0 | | |
| (6) B WORK-IN-PROCESS QUANTITY S(6~8)b AT P6~P8 | 0 | 0 | 200 | 200 | 0 | 0 | | |
| QUANTITY OF B REQUIRED TO BE PROCESSED AT P9 | 0 | 200 | 200 | 0 | 0 | | | |
| LEAD TIME: THREE DAYS, YIELD: 100 % | | | | | | | | |
| (7) B TARGET PROCESSING QUANTITY L9b FOR P9 | 0 | 200 | 200 | 0 | 0 | | | |

FIG. 7

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) A TARGET PROCESSING QUANTITY L1a FOR P1 | 900 | 910 | 1200 | 1150 | 950 | 1000 | 1150 | 1200 |
| (2) A WORK-IN-PROCESS QUANTITY S(1~2)a AT P1~P2 | 1200 | 910 | 1200 | 1150 | 950 | 1000 | 1150 | 1200 |
| QUANTITY OF A REQUIRED TO BE PROCESSED AT P3 | 610 | 1200 | 1150 | 950 | 1000 | 1150 | 1200 | 0 |

LEAD TIME: ONE DAY, YIELD: 100 %

| (3) A TARGET PROCESSING QUANTITY L3a FOR P3 | 610 | 1200 | 1150 | 950 | 1000 | 1150 | 1200 | |
| (4) A WORK-IN-PROCESS QUANTITY S(3~5)a AT P3~P5 | 700 | 1200 | 1150 | 950 | 1000 | 1150 | 1200 | |
| QUANTITY OF A REQUIRED TO BE PROCESSED AT P6 | 1110 | 1150 | 950 | 1000 | 1150 | 1200 | | |

LEAD TIME: TWO DAYS, YIELD: 100 %

| (5) A MINIMUM TARGET PROCESSING QUANTITY L6amin FOR P6 | 1110 | 1150 | 950 | 1000 | 1150 | 1200 | | |
| (6) A WORK-IN-PROCESS QUANTITY S(6~8)a AT P6~P8 | 1150 | 1150 | 950 | 1000 | 1150 | 1200 | | |
| QUANTITY OF A REQUIRED TO BE PROCESSED AT P9 | 1110 | 950 | 1000 | 1150 | 1200 | | | |

LEAD TIME: THREE DAYS, YIELD: 100 %

| (7) A TARGET PROCESSING QUANTITY L9a FOR P9 | 1110 | 950 | 1000 | 1150 | 1200 | | | |

FIG. 8

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) B TARGET PROCESSING QUANTITY L1b FOR P1 | 200 | 200 | 0 | 0 | 200 | 200 | 0 | 0 |
| (2) B WORK-IN-PROCESS QUANTITY S(1~2)b AT P1~P2 | 250 | 200 | 0 | 0 | 200 | 200 | 0 | 0 |
| QUANTITY OF B REQUIRED TO BE PROCESSED AT P3 | 150 | 0 | 0 | 200 | 200 | 200 | 0 | 0 |

LEAD TIME: ONE DAY, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (3) B TARGET PROCESSING QUANTITY L3b FOR P3 | 150 | 0 | 0 | 200 | 200 | 0 | 0 | |
| (4) B WORK-IN-PROCESS QUANTITY S(3~5)b AT P3~P5 | 150 | 0 | 200 | 200 | 200 | 0 | 0 | |
| QUANTITY OF B REQUIRED TO BE PROCESSED AT P6 | 0 | 0 | 200 | 200 | 0 | 0 | 0 | |

LEAD TIME: TWO DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (5) B MINIMUM TARGET PROCESSING QUANTITY L6bmin FOR P6 | 0 | 0 | 200 | 200 | 0 | 0 | 0 | |
| (6) B WORK-IN-PROCESS QUANTITY S(6~8)b AT P6~P8 | 0 | 0 | 200 | 200 | 0 | 0 | 0 | |
| QUANTITY OF B REQUIRED TO BE PROCESSED AT P9 | 0 | 200 | 200 | 0 | 0 | 0 | 0 | |

LEAD TIME: THREE DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (7) B TARGET PROCESSING QUANTITY L9b FOR P9 | 0 | 200 | 200 | 0 | 0 | | | |

FIG. 9

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (8) A+B MINIMUM TARGET PROCESSING QUANTITY L6a+b,min FOR P6 | 1110 | 1150 | 1150 | 1200 | 1150 | 1200 | | |
| (9) SURPLUS CAPACITY (M6−L6a+b,min) | 90 | 50 | 50 | 0 | 50 | 0 | | |
| (10) A TARGET PROCESSING QUANTITY L6a' FOR P6 | 1200 | 1200 | 1000 | 1000 | 1200 | 1200 | | |
| (11) A WORK-IN-PROCESS QUANTITY S(6~8)a AT P6~P8 | 1150 | 1200 | 1000 | 1000 | 1200 | 1200 | | |
| (12) A TARGET PROCESSING QUANTITY L6a FOR P6 | 1150 | 1200 | 1000 | 1000 | 1200 | 1200 | | |
| QUANTITY OF A REQUIRED TO BE PROCESSED AT P9 | 1200 | 1000 | 1200 | 1200 | 1200 | | | |

LEAD TIME: THREE DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (13) A TARGET PROCESSING QUANTITY L9a FOR P9 | 1200 | 1000 | 1200 | 1200 | | | | |

FIG. 10

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) A TARGET PROCESSING QUANTITY L1a FOR P1 | 1200 | 1200 | 1000 | 1000 | 1200 | 1200 | | |
| (2) A WORK-IN-PROCESS QUANTITY S(1~2)a AT P1~P2 | 1300 | 1200 | 1000 | 1000 | 1200 | 1200 | | |
| QUANTITY OF A REQUIRED TO BE PROCESSED AT P3 | 1100 | 1000 | 1000 | 1200 | 1200 | 0 | | |

LEAD TIME: ONE DAY, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (3) A TARGET PROCESSING QUANTITY L3a FOR P3 | 1100 | 1000 | 1000 | 1200 | 1200 | | | |
| (4) A WORK-IN-PROCESS QUANTITY S(3~5)a AT P3~P5 | 1150 | 1000 | 1000 | 1200 | 1200 | | | |
| QUANTITY OF A REQUIRED TO BE PROCESSED AT P6 | 950 | 1000 | 1200 | 1200 | 0 | | | |

LEAD TIME: TWO DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (5) A TARGET PROCESSING QUANTITY L6a FOR P6 | 950 | 1000 | 1200 | 1200 | | | | |
| (6) A WORK-IN-PROCESS QUANTITY S(6~8)a AT P6~P8 | 1100 | 1000 | 1200 | 1200 | | | | |
| QUANTITY OF A REQUIRED TO BE PROCESSED AT P9 | 850 | 1200 | 1200 | | | | | |

LEAD TIME: THREE DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (7) A TARGET PROCESSING QUANTITY L9a FOR P9 | 850 | 1200 | 1200 | | | | | |

FIG. 12

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) A TARGET PROCESSING QUANTITY L1a FOR P1 | 1200 | 1200 | 1000 | 1000 | 1200 | 1200 | | |
| (2) A WORK-IN-PROCESS QUANTITY S(1~2)a AT P1~P2 | 1300 | 1200 | 1000 | 1000 | 1200 | 1200 | | |
| QUANTITY OF A REQUIRED TO BE PROCESSED AT P3 | 1100 | 1000 | 1000 | 1200 | 1200 | 0 | | |
| LEAD TIME: ONE DAY, YIELD: 100 % | | | | | | | | |
| (3) A TARGET PROCESSING QUANTITY L3a FOR P3 | 1100 | 1000 | 1000 | 1200 | 1200 | | | |
| (4) A WORK-IN-PROCESS QUANTITY S(3~5)a AT P3~P5 | 1150 | 1000 | 1000 | 1200 | 1200 | | | |
| QUANTITY OF A REQUIRED TO BE PROCESSED AT P6 | 950 | 1000 | 1200 | 1200 | 0 | | | |
| LEAD TIME: TWO DAYS, YIELD: 100 % | | | | | | | | |
| (5) A MINIMUM TARGET PROCESSING QUANTITY L6amin FOR P6 | 950 | 1000 | 1200 | 1200 | | | | |
| (6) A WORK-IN-PROCESS QUANTITY S(6~8)a AT P6~P8 | 1100 | 1000 | 1200 | 1200 | | | | |
| QUANTITY OF A REQUIRED TO BE PROCESSED AT P9 | 850 | 1200 | 1200 | | | | | |
| LEAD TIME: THREE DAYS, YIELD: 100 % | | | | | | | | |
| (7) A TARGET PROCESSING QUANTITY L9a FOR P9 | 850 | 1200 | 1200 | | | | | |

FIG. 13

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) B TARGET PROCESSING QUANTITY L1b FOR P1 | 0 | 0 | 200 | 200 | 0 | 0 | | |
| (2) B WORK-IN-PROCESS QUANTITY S(1~2)b AT P1~P2 | 0 | 0 | 200 | 200 | 0 | | | |
| QUANTITY OF B REQUIRED TO BE PROCESSED AT P3 | 0 | 200 | 200 | 0 | | | | |

LEAD TIME: ONE DAY, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (3) B TARGET PROCESSING QUANTITY L3b FOR P3 | 0 | 200 | 200 | 0 | 0 | | | |
| (4) B WORK-IN-PROCESS QUANTITY S(3~5)b AT P3~P5 | 0 | 200 | 200 | 0 | 0 | | | |
| QUANTITY OF B REQUIRED TO BE PROCESSED AT P6 | 200 | 200 | 0 | 0 | | | | |

LEAD TIME: TWO DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (5) B MINIMUM TARGET PROCESSING QUANTITY L6bmin FOR P6 | 200 | 200 | 0 | 0 | | | | |
| (6) B WORK-IN-PROCESS QUANTITY S(6~8)b AT P6~P8 | 200 | 200 | 0 | | | | | |
| QUANTITY OF B REQUIRED TO BE PROCESSED AT P9 | 200 | 0 | | | | | | |

LEAD TIME: THREE DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (7) B TARGET PROCESSING QUANTITY L9b FOR P9 | 200 | | | | | | | |

FIG. 14

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (8) A+B MINIMUM TARGET PROCESSING QUANTITY L6a+b,min FOR P6 | 1150 | 1200 | 1200 | 1200 | | | | |
| (9) SURPLUS CAPACITY (1200−L6a+b,min) | 50 | 0 | 0 | 0 | | | | |
| (10) A TARGET PROCESSING QUANTITY L6a FOR P6 | 1000 | 1000 | 1200 | 1200 | | | | |
| (11) A WORK-IN-PROCESS QUANTITY S(6~8)a AT P6~P8 | 1100 | 1000 | 1200 | 1200 | | | | |
| QUANTITY OF A REQUIRED TO BE PROCESSED AT P9 | 900 | 1200 | 1200 | 0 | | | | |

LEAD TIME: THREE DAYS, YIELD: 100 %

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (12) A TARGET PROCESSING QUANTITY L9a FOR P9 | 900 | 1200 | | | | | | |

FIG. 15

| | TODAY | ONE DAY LATER | TWO DAYS LATER | THREE DAYS LATER | FOUR DAYS LATER | FIVE DAYS LATER |
|---|---|---|---|---|---|---|
| A TARGET PROCESSING QUANTITY L1a FOR P1 | 900 | 910 | 1200 | 1150 | 950 | 1000 |
| A TARGET PROCESSING QUANTITY L6a FOR P6 | 1200 | 1200 | 1000 | 1000 | 1200 | 1200 |
| DIFFERENCE D61a BETWEEN A TARGET PROCESSING QUANTITIES | 300 | 290 | -200 | -150 | 250 | 200 |

FIG. 16

| | TODAY | ONE DAY LATER | TWO DAYS LATER | THREE DAYS LATER |
|---|---|---|---|---|
| A TARGET PROCESSING QUANTITY L1a FOR P1 | 1200 | 1200 | 1000 | 1000 |
| A TARGET PROCESSING QUANTITY L6a FOR P6 | 1000 | 1000 | 1200 | 1200 |
| DIFFERENCE D61a BETWEEN A TARGET PROCESSING QUANTITIES | -200 | -200 | 200 | 200 |

FIG. 17

| PRODUCT TYPE | PROCESS | MODEL | | 1/21 (WED) | 1/22 (THU) | 1/23 (FRI) | 1/24 (SAT) | 1/25 (SUN) | 1/26 (MON) | 1/27 (TUE) | 1/28 (WED) |
|---|---|---|---|---|---|---|---|---|---|---|---|
| 8.0" | TFT | 012ZZ | PLAN a | 0 | 446 | 892 | 892 | 0 | 0 | 0 | 0 |
| 8.0" | TFT | 012ZZ | RESULT c | 0 | 430 | 360 | 892 | | | | |
| 8.0" | TFT | 012ZZ | Σ c−a | 0 | −16 | −548 | −548 | −548 | −548 | −548 | −548 |
| 5.0"W | TFT | 034AA | PLAN a | 0 | 698 | 270 | 0 | 892 | 892 | 892 | 306 |
| 5.0"W | TFT | 034AA | RESULT c | 0 | 688 | 220 | 0 | | | | |
| 5.0"W | TFT | 034AA | Σ c−a | 0 | −10 | −60 | −60 | −952 | −1844 | −2736 | −3042 |
| 7.0"W | TFT | 022AH | PLAN a | 1940 | 794 | 776 | 1047 | 1047 | 504 | 504 | 1047 |
| 7.0"W | TFT | 022AH | RESULT c | 2000 | 800 | 800 | 877 | | | | |
| 7.0"W | TFT | 022AH | Σ c−a | 60 | 66 | 90 | −80 | −1127 | −1631 | −2135 | −3182 |
| 20.0" | TFT | 044AS | PLAN a | 0 | 0 | 0 | 0 | 0 | 0 | 0 | 0 |
| 20.0" | TFT | 044AS | RESULT c | 0 | 0 | 0 | 0 | | | | |
| 20.0" | TFT | 044AS | Σ c−a | 0 | 0 | 0 | 0 | 0 | 0 | 0 | 0 |
| 45" | TFT | 100SF | PLAN a | 0 | 86 | 0 | 0 | | | | |
| 45" | TFT | 100SF | RESULT c | 84 | 0 | 0 | 0 | | | | |
| 45" | TFT | 100SF | Σ c−a | 84 | −2 | −2 | −2 | −2 | −2 | −2 | −2 |

FIG. 18

| PRODUCT TYPE | PROCESS | MODEL | | 1/21 (WED) | 1/22 (THU) | 1/23 (FRI) | 1/24 (SAT) | 1/25 (SUN) | 1/26 (MON) | 1/27 (TUE) | 1/28 (WED) |
|---|---|---|---|---|---|---|---|---|---|---|---|
| 8.0" | TFT | 012ZZ | PLAN a | 0 | 446 | 892 | 892 | 0 | 0 | 0 | 0 |
| 8.0" | TFT | 012ZZ | RESULT c | 0 | 430 | 360 | 892 | 0 | 0 | 0 | 548 |
| 8.0" | TFT | 012ZZ | Σ c−a | 0 | −16 | −548 | −548 | −548 | −548 | −548 | 0 |
| 5.0"W | TFT | 034AA | PLAN a | 0 | 698 | 270 | 0 | 892 | 892 | 892 | 306 |
| 5.0"W | TFT | 034AA | RESULT c | 0 | 688 | 220 | 0 | 486 | 892 | 892 | 772 |
| 5.0"W | TFT | 034AA | Σ c−a | 0 | −10 | −60 | −60 | −466 | −466 | −466 | 0 |
| 7.0"W | TFT | 022AH | PLAN a | 1940 | 794 | 776 | 1047 | 1047 | 504 | 504 | 1047 |
| 7.0"W | TFT | 022AH | RESULT c | 2000 | 800 | 800 | 877 | 1100 | 500 | 550 | 1000 |
| 7.0"W | TFT | 022AH | Σ c−a | 60 | 66 | 90 | −80 | −27 | −31 | 15 | −32 |
| 20.0" | TFT | 044AS | PLAN a | 0 | 0 | 0 | 0 | 0 | 0 | 0 | 0 |
| 20.0" | TFT | 044AS | RESULT c | 0 | 0 | 0 | | 0 | 0 | 0 | 0 |
| 20.0" | TFT | 044AS | Σ c−a | 0 | 0 | 0 | 0 | 0 | 0 | 0 | 0 |
| 45" | TFT | 100SF | PLAN a | 0 | 86 | 0 | 0 | 0 | 0 | 0 | 0 |
| 45" | TFT | 100SF | RESULT c | 84 | 0 | −2 | −2 | 0 | 2 | 0 | 0 |
| 45" | TFT | 100SF | Σ c−a | 84 | −2 | −2 | −2 | −2 | 0 | 0 | 0 |

FIG. 19

| PRODUCT TYPE | PROCESS | MODEL | | 1/21 (WED) | 1/22 (THU) | 1/23 (FRI) | 1/24 (SAT) | 1/25 (SUN) | 1/26 (MON) | 1/27 (TUE) | 1/28 (WED) |
|---|---|---|---|---|---|---|---|---|---|---|---|
| 8.0" | TFT | 012ZZ | PLAN a | 0 | 446 | 892 | 892 | 0 | 0 | 0 | 0 |
| 8.0" | TFT | 012ZZ | RESULT c | 0 | 430 | 360 | 892 | 0 | 0 | 0 | 400 |
| 8.0" | TFT | 012ZZ | Σ c−a | 0 | −16 | −548 | −548 | −548 | −548 | −548 | −148 |
| 5.0"W | TFT | 034AA | PLAN a | 0 | 698 | 270 | 0 | 892 | 892 | 892 | 306 |
| 5.0"W | TFT | 034AA | RESULT c | 0 | 688 | 220 | 0 | 486 | 892 | 892 | 772 |
| 5.0"W | TFT | 034AA | Σ c−a | 0 | −10 | −60 | −60 | −466 | −466 | −466 | 0 |
| 7.0"W | TFT | 022AH | PLAN a | 1940 | 794 | 776 | 1047 | 1047 | 504 | 504 | 1047 |
| 7.0"W | TFT | 022AH | RESULT c | 2000 | 800 | 800 | 877 | 1100 | 500 | 550 | 1000 |
| 7.0"W | TFT | 022AH | Σ c−a | 60 | 66 | 90 | −80 | −27 | −31 | 15 | −32 |
| 20.0" | TFT | 044AS | PLAN a | 0 | 0 | 0 | 0 | 0 | 0 | 0 | 0 |
| 20.0" | TFT | 044AS | RESULT c | 0 | 0 | 0 | | 0 | 0 | 0 | 0 |
| 20.0" | TFT | 044AS | Σ c−a | 0 | 0 | 0 | 0 | 0 | 0 | 0 | 0 |
| 45" | TFT | 100SF | PLAN a | 0 | 86 | 0 | 0 | 0 | 0 | 0 | 0 |
| 45" | TFT | 100SF | RESULT c | 84 | 0 | 0 | 0 | 0 | 2 | 0 | 0 |
| 45" | TFT | 100SF | Σ c−a | 84 | −2 | −2 | −2 | −2 | 0 | 0 | 0 |

| | | | | | | | | |
|---|---|---|---|---|---|---|---|---|
| TOTAL QUANTITY PLANNED Y | 1940 | 2024 | 1938 | 1939 | 1939 | 1396 | 1396 | 1353 |
| CUMULATIVE TOTAL QUANTITY PLANNED Y' | 1940 | 3964 | 5902 | 7841 | 9780 | 11176 | 12572 | 13925 |
| TOTAL CUMULATIVE DELAY QUANTITY D' | 0 | −28 | −610 | −690 | −1043 | −1045 | −1014 | −180 |
| PLAN OBSERVANCE RATE | 100.0% | 99.3% | 89.7% | 91.2% | 89.3% | 90.6% | 91.9% | 98.7% |

FIG. 20

| PRODUCT TYPE | PROCESS | MODEL | | 1/21 (WED) | 1/22 (THU) | 1/23 (FRI) | 1/24 (SAT) | 1/25 (SUN) | 1/26 (MON) | 1/27 (TUE) | 1/28 (WED) |
|---|---|---|---|---|---|---|---|---|---|---|---|
| 8.0″ | TFT | 012ZZ | PLAN a | 0 | 446 | 892 | 892 | 0 | 0 | 0 | 0 |
| 8.0″ | TFT | 012ZZ | RESULT c | 0 | 430 | 360 | 892 | 0 | 0 | 0 | 548 |
| 8.0″ | TFT | 012ZZ | Σ c−a | 0 | −16 | −548 | −548 | −548 | −548 | −548 | 0 |
| 5.0″W | TFT | 034AA | PLAN a | 0 | 698 | 270 | 0 | 892 | 892 | 892 | 306 |
| 5.0″W | TFT | 034AA | RESULT c | 0 | 688 | 220 | 0 | 486 | 892 | 892 | 400 |
| 5.0″W | TFT | 034AA | Σ c−a | 0 | −10 | −60 | −60 | −466 | −466 | −466 | −372 |
| 7.0″W | TFT | 022AH | PLAN a | 1940 | 794 | 776 | 1047 | 1047 | 504 | 504 | 1047 |
| 7.0″W | TFT | 022AH | RESULT c | 2000 | 800 | 800 | 877 | 1100 | 500 | 550 | 1200 |
| 7.0″W | TFT | 022AH | Σ c−a | 60 | 66 | 90 | −80 | −27 | −31 | 15 | 168 |
| 20.0″ | TFT | 044AS | PLAN a | 0 | 0 | 0 | 0 | 0 | 0 | 0 | 0 |
| 20.0″ | TFT | 044AS | RESULT c | 0 | 0 | 0 | 0 | 0 | 0 | 0 | 0 |
| 20.0″ | TFT | 044AS | Σ c−a | 0 | 0 | 0 | 0 | 0 | 0 | 0 | 0 |
| 45″ | TFT | 100SF | PLAN a | 0 | 86 | 0 | 0 | 0 | 0 | 0 | 0 |
| 45″ | TFT | 100SF | RESULT c | 84 | 0 | 0 | 0 | 0 | 0 | 2 | 0 |
| 45″ | TFT | 100SF | Σ c−a | 84 | −2 | −2 | −2 | −2 | −2 | 0 | 0 |

| | | | | | | | |
|---|---|---|---|---|---|---|---|
| TOTAL QUANTITY PLANNED Y | 1940 | 2024 | 1938 | 1939 | 1939 | 1396 | 1396 | 1353 |
| CUMULATIVE TOTAL QUANTITY PLANNED Y' | 1940 | 3964 | 5902 | 7841 | 9780 | 11176 | 12572 | 13925 |
| TOTAL CUMULATIVE DELAY QUANTITY D' | 0 | −28 | −610 | −690 | −1043 | −1045 | −1014 | −372 |
| PLAN OBSERVANCE RATE | 100.0% | 99.3% | 89.7% | 91.2% | 89.3% | 90.6% | 91.9% | 97.3% |

FIG. 21

CALCULATION OF TARGET LAUNCHING QUANTITY FOR PROCESS P06

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) TARGET PROCESSING QUANTITY L01 FOR P01 | 900 | 910 | 1200 | 1150 | 950 | 1000 | 1150 | 1200 |
| (2) WORK-IN-PROCESS QUANTITY S0(1~2) AT P01~P02 | 1200 | 910 | 1200 | 1150 | 950 | 1000 | 1150 | 1200 |
| QUANTITY REQUIRED TO BE PROCESSED AT P03 | 610 | 1200 | 1150 | 950 | 1000 | 1150 | 1200 | 0 |

LEAD TIME: ONE DAY, YIELD: 100 %

| | | | | | | | | |
|---|---|---|---|---|---|---|---|---|
| (3) TARGET PROCESSING QUANTITY L03 FOR P03 | 610 | 1200 | 1150 | 950 | 1000 | 1150 | 1200 | |
| (4) WORK-IN-PROCESS QUANTITY S0(3~5) AT P03~P05 | 700 | 1200 | 1150 | 950 | 1000 | 1150 | 1200 | |
| QUANTITY REQUIRED TO BE PROCESSED AT P06 | 1110 | 1150 | 950 | 1000 | 1150 | 1200 | | |

LEAD TIME: TWO DAYS, YIELD: 100 %

| | | | | | | | | |
|---|---|---|---|---|---|---|---|---|
| (5) TARGET PROCESSING QUANTITY L06 FOR P06 | 1110 | 1150 | 950 | 1000 | 1150 | 1200 | | |

FIG. 22

CALCULATION OF TARGET LAUNCHING QUANTITY FOR TFT PROCESS
INTERMEDIATE WAREHOUSE LEAD TIME: THREE DAYS

| | TODAY | ONE DAY LATER | TWO DAYS LATER | THREE DAYS LATER | FOUR DAYS LATER | FIVE DAYS LATER | SIX DAYS LATER | SEVEN DAYS LATER |
|---|---|---|---|---|---|---|---|---|
| (1) TARGET PROCESSING QUANTITY L1 FOR P1 | 1110 | 1150 | 950 | 1000 | 1150 | 1200 | | |
| (2) WORK-IN-PROCESS QUANTITY S(1) AT P1 | 3000 | 3100 | 3100 | 3350 | | | | |
| QUANTITY REQUIRED TO BE PROCESSED AT Pa2 | 1210 | 1150 | 1200 | | | | | |

LEAD TIME: FOUR DAYS, YIELD: 100 %

| | | | | | | | | |
|---|---|---|---|---|---|---|---|---|
| (3) TARGET PROCESSING QUANTITY La2 FOR Pa2 | 1210 | 1150 | 1200 | 0 | 0 | 0 | 0 | |
| (4) WORK-IN-PROCESS QUANTITY Sa(3~5) AT Pa3~Pa5 | 700 | 1150 | 1200 | 0 | 0 | 0 | 0 | |
| QUANTITY REQUIRED TO BE PROCESSED AT Pa6 | 1660 | 1200 | 0 | 0 | 0 | 0 | | |

LEAD TIME: FIVE DAYS, YIELD: 100 %

| | | | | | | | | |
|---|---|---|---|---|---|---|---|---|
| (5) TARGET PROCESSING QUANTITY La6 FOR Pa6 | 1660 | 1200 | 0 | 0 | 0 | 0 | | |

FIG. 23

| FIG. 23A | FIG. 23B |

FIG. 23A

| | TYPICAL MODELS OF PANEL |
|---|---|
| (A) TARGET PROCESSING QUANTITY OF EACH PRODUCT TO BE PROCESSED AT PROCESS Pk THREE DAYS LATER | (1) PRODUCT TYPE A<br>(2) PRODUCT TYPE B<br>(3) PRODUCT TYPE C1<br>(4) PRODUCT TYPE C2<br>(5) PRODUCT TYPE C3<br>(6) PRODUCT TYPE D |
| (B) TOTAL TARGET PROCESSING QUANTITY FOR ALL PRODUCT TYPES TO BE PROCESSED AT THREE DAYS LATER AND TOTAL PROCESSABLE QUANTITY IN EACH DAY AT THE PROCESS Pk | (1) TOTAL TARGET PROCESSING QUANTITY<br>(2) TOTAL PROCESSABLE QUANTITY<br>(3) NUMBER OF SETUP CHANGES<br>(4) CUMULATIVE SCHEDULED PROCESSING QUANTITY<br>(5) QUANTITY REMAINING TO MEET CUMULATIVE TARGET PROCESSING QUANTITY |
| (C) TARGET PROCESSING QUANTITY OF PRODUCT GROUP C TO BE PROCESSED AT PROCESS Pk THREE DAYS LATER AND QUANTITY SCHEDULED TO BE PROCESSED ON THE DAY OF INTEREST | (1) TARGET PROCESSING QUANTITY OF PRODCUT TYPE C<br>(2) SCHEDULED PROCESSING QUANTITY<br>(3) QUANTITY REMAINING TO MEET SCHEDULED PROCESSING QUANTITY<br>(4) CUMULATIVE TARGET PROCESSING QUANTITY<br>(5) CUMULATIVE SCHEDULED PROCESSING QUANTITY<br>(6) CHECK VALUE FOR DELAY OF THREE DAYS OR MORE |
| (D) SCHEDULED PROCESSING QUANTITY OF PRODUCT TYPE A | (1) TARGET PROCESSING QUANTITY OF PRODUCT TYPE A<br>(2) SHEDULED PROCESSING QUANTITY<br>(3) QUANTITY REMAINING TO MEET TARGET PROCESSING QUANTITY |
| (E) SCHEDULED PROCESSING QUANTITY OF PRODUCT TYPE D | (1) TARGET PROCESSING QUANTITY OF PRODUCT TYPE D<br>(2) SHEDULED PROCESSING QUANTITY<br>(3) QUANTITY REMAINING TO MEET TARGET PROCESSING QUANTITY |
| (F) TARGET PROCESSING QUANTITY OF PRODUCT TYPE B TO BE PROCESSED AT PROCESS Pk THREE DAYS LATER AND QUANTITY SCHEDULED TO BE PROCESSED ON THE DAY OF INTEREST | (1) TARGET PROCESSING QUANTITY OF PRODUCT TYPE B<br>(2) SCHEDULED PROCESSING QUANTITY<br>(3) QUANTITY REMAINING TO MEET SCHEDULED PROCESSING QUANTITY<br>(4) CUMULATIVE TARGET PROCESSING QUANTITY<br>(5) CUMULATIVE SCHEDULED PROCESSING QUANTITY<br>(6) CHECK VALUE FOR DELAY OF THREE DAYS OR MORE |

FIG. 23B

METHOD OF PRODUCTION CONTROL AND METHOD OF MANUFACTURING INDUSTRIAL PRODUCTS

BACKGROUND OF THE INVENTION

1. Field of the Invention

The present invention relates to a method of production control and a method of manufacturing industrial products and, more particularly, to a method of production control and a method of manufacturing industrial products which are preferably used for the manufacture of electronic apparatus such as liquid crystal displays.

2. Description of the Related Art

A method of production referred to as a "Kanban system" is known as a method for eliminating wasteful work in process and centralizing flows of information (see Non-Patent Document 1 for example). In a Kanban system, units required at a process are withdrawn from the preceding process in the quantity of units which have been used at the subsequent process, and the unit is replenished at the preceding process in the quantity of the units withdrawn, which allows the production to be performed on a "just-in-time" basis. What is important for a Kanban system is that production-ordering Kanbans for a process accompany physical units without fail and that units are produced in quantities shown on Kanbans which have been detached and in the order in which the Kanbans have been detached.

It is a prerequisite for the Kanban system that the types and quantities of products to be produced are smoothed in making a monthly production plan and production capacity plan so that production will be continuously performed at a constant daily rate. When there are significant demand changes or when a great batch of products of the same type is produced during a setup change, product types to be produced or the ratio between the product types may change every day. In such a case, a determination cannot be made on when to launch a product even if a Kanban for the product is detached or whether to launch a product before a Kanban for the product is detached. A problem therefore arises in that it is difficult to use the Kanban system in such a case.

In the case of the Kanban system, since a processing target for even a bottleneck process or restricted process is determined by the number of Kanbans and the progress of processing at the subsequent process, a problem arises in that the bottleneck process or restricted process cannot necessarily be run to its maximum capacity. Further, when there is a plurality of bottleneck processes or restricted processes, since the stoppage of processing at a subsequent bottleneck has influence on processing at a preceding bottleneck, a problem arises in that the throughput of the entire production line cannot be improved.

Furthermore, in the case of a production line which has not been smoothed with respect to the types and quantities of products, it may sometimes be difficult to achieve an initial production plan only through a comparison between the actual production and the plan because of not only demand changes but also various disturbances that may occur on the production line. Another problem is that there is no method of production control which is effective in such a case. In particular, when a forecast is revised, it is difficult to make a comprehensive evaluation of production by evaluating production of each product type. No effective index for evaluation has been available in such a case.

A significant problem arises in the Kanban system when a process requiring a long time for a setup change is a bottleneck process or restricted process. In such a case, a required quantity cannot be processed without reducing the number of setup changes. Such a production line is under limitations such as the fact that a required quantity of products cannot be achieved without processing the single product type for one day or more, and a problem therefore arises even when Kanbans are used in that production cannot be started in accordance with Kanbans which have been detached.

When outputs from a plurality of production lines manufacturing parts and half-finished products are supplied to a combining line or aligning line, if the production lines are not smoothed in terms of types and quantities of the parts and products, a problem arises in that it is difficult to make a production plan on the basis of the pull system because no effective method of production control exists for such production lines.

Patent Document 1: JP-A-2001-273023
Patent Document 2: JP-A-2002-244708
Patent Document 3: JP-A-2004-152052
Patent Document 4: JP-A-2001-273021
Patent Document 5: JP-A-8-25191
Non-Patent Document 1: "Seisan Kanri ga Wakaru Jiten", Nippon Jitsugyo Publishing Co., Ltd., Tadami Sugamata and Kazunari Tanaka, March 1986, p. 301

SUMMARY OF THE INVENTION

It is an object of the invention to provide a method of production control and a method of manufacturing industrial products which allow a target quantity for processing at a process to be properly set for improved throughput of the production line as a whole.

The object is achieved by a method of production control for a production line including a plurality of processes, characterized in that it includes the step of obtaining a target processing quantity Lk for a process Pk from:

$$Lk = Nk - SKk (Nk > SKk)$$

$$Lk = 0 (Nk \leq SKk)$$

where the processes are represented by Pn (n=1, 2, ..., k−1, k, ...) in the order of their closeness to warehousing; Nk represents a total quantity scheduled to be warehoused from a day as a starting point until after lead time Tk from the process Pk up to the warehousing passes; and SKk represents an expected cumulative quantity completed, which will contribute to the warehousing, among work in process which has passed through the process Pk.

The object is achieved by a method of production control for a production line including a plurality of processes, characterized in that it includes the steps of:

obtaining a minimum target processing quantity Lkmin for a process Pk from:

$$Lk\mathrm{min} = Nk - SKk (Nk > SKk)$$

$$Lk\mathrm{min} = 0 (Nk \leq SKk)$$

where the processes are represented by Pn (n=1, 2, ..., k−1, k, ...) in the order of their closeness to warehousing; the process Pk is a bottleneck process or restricted process; Nk represents a total quantity scheduled to be warehoused from a day as a starting point until after lead time Tk from the process Pk up to the warehousing passes; and SKk represents an expected cumulative quantity completed, which will contribute to the warehousing, among work in process which has passed through the process Pk, calculating a surplus capacity of the process Pk by comparing the minimum target processing quantity Lkmin and a maximum processing capacity Mk of the process Pk, and obtaining a target processing quantity Lk for the process Pk by adding a quantity available with the surplus capacity to the minimum target processing quantity Lkmin.

The object is also achieved by a method of production control for a production line including a plurality of processes and producing a plurality of product types, characterized in that it includes the step of obtaining a target processing quantity Luk for a product type u at a process Pk from:

$$Luk=Nuk-SKuk(Nuk>SKuk)$$

$$Luk=0(Nuk \leq SKuk)$$

where the processes are represented by Pn (n=1, 2, ..., k−1, k, ...) in the order of their closeness to warehousing; Nuk represents a total quantity scheduled to be warehoused from a day as a starting point until after lead time Tuk for the product type u from the process Pk up to the warehousing passes; and SKuk represents a cumulative quantity of the product type u expected to be completed, which will contribute to warehousing, among work in process which has passed through the process Pk.

The object is also achieved by a method of production control for a production line including a plurality of processes and producing a plurality of product types, characterized in that it includes the steps of obtaining a cumulative lead/delay quantity Duk(g) of a product type u at a process Pk on the g-th day from the starting day of a plan from:

$$Duk(g) = \sum_{m=1}^{h} Juk(m) + \sum_{m=h+1}^{g} Juk(m) - \sum_{m=1}^{g} Yuk(m)$$

where a plan revision is conducted starting with the h-th day from the starting day of the plan; a forecast is revised for the period from the h-th day up to the g-th day from the starting day of the plan; the processes are represented by Pn (n=1, 2, ..., k−1, k, ...) in the order of their closeness to warehousing; Juk(m) represents the actual processed quantity of the product type u at the process Pk on the m-th day; and Yuk(m) represents a target processing quantity for the product type u at the process Pk on the m-th day, and forecasting a lead or delay of processing of each product type at the process Pk in the future based on the cumulative lead/delay quantity Duk(g).

The object is also achieved by a method of production control for a production line including an assembly line for assembling a plurality of half-finished products or parts to fabricate a product or half-finished product and a plurality of manufacturing lines for manufacturing the plurality of half-finished products or parts, respectively, characterized in that it includes the step of obtaining a target processing quantity Lak for a process Pak from:

$$Lak=Nak-SKak(Nak>SKak)$$

$$Lak=0(Nak \leq SKak)$$

where P0 represents a launching process of the assembly line; P1 represents a warehouse process preceding the process P0; Pa2 represents a shipping process of a manufacturing line A that is one of the plurality of manufacturing lines; processes of the manufacturing line A are represented by Pan (n=3, 4, ..., k, ...) in the order of their closeness to shipment; Nak represents a total quantity scheduled to be launched from the manufacturing line A since the starting day until after the lead time Tak for the processes Pak through P1 passes; and SKak represents an expected cumulative quantity completed, which will contribute to the shipment from the process P1, among work in process which has passed through the process Pak.

The object is achieved by a method of manufacturing industrial products using a production line including a plurality of processes, characterized in that it employs any of the methods of production control according to the invention described above.

The invention makes it possible to set a target processing quantity for a process properly and to improve the throughput of a production line as a whole.

BRIEF DESCRIPTION OF THE DRAWINGS

FIG. 3 shows steps for calculating a target processing quantity for a product type B using the method of production control according to the first embodiment of the invention;

FIG. 7 shows steps for calculating a minimum target processing quantity for the product type A at a bottleneck process using a method of production control according to a third embodiment of the invention;

FIG. 8 shows steps for calculating a minimum target processing quantity for the product type B at a bottleneck process using the method of production control according to the third embodiment of the invention;

FIG. 9 shows steps for calculating a target processing quantity for the product type A at a bottleneck process using the method of production control according to the third embodiment of the invention;

FIG. 10 shows steps for calculating a target processing quantity for the product type A at a process other than a bottleneck process using a method of production control according to a fourth embodiment of the invention;

FIG. 12 shows steps for calculating a minimum target processing quantity for the product type A at a bottleneck process using a method of production control according to a fifth embodiment of the invention;

FIG. 13 shows steps for calculating a minimum target processing quantity for the product type B at a bottleneck process using the method of production control according to the fifth embodiment of the invention;

FIG. 14 shows steps for calculating a target processing quantity for the product type A at a bottleneck process using the method of production control according to the fifth embodiment of the invention;

FIG. 15 explains a method of production control according to a sixth embodiment of the invention;

FIG. 16 explains the method of production control according to the sixth embodiment of the invention;

FIG. 17 shows steps for evaluating leads and delays of processing of each product type using a method of production control according to an eighth embodiment of the invention;

FIG. 18 shows steps for evaluating delays of processing of each product type using a method of production control according to a ninth embodiment of the invention;

FIG. 19 shows steps for evaluating a first revised forecast using a method of production control according to a tenth embodiment of the invention;

FIG. 20 shows steps for evaluating a second revised forecast using the method of production control according to the tenth embodiment of the invention;

FIG. 21 shows steps for calculating a target processing quantity using a method of production control according to an eleventh embodiment of the invention;

FIG. 22 shows steps for calculating a target processing quantity using the method of production control according to the eleventh embodiment of the invention; and FIG. 23 shows steps for adjusting a target processing quantity using a method of production control according to a twelfth embodiment of the invention.

DETAILED DESCRIPTION OF THE PREFERRED EMBODIMENTS

First Embodiment

Figure 1:
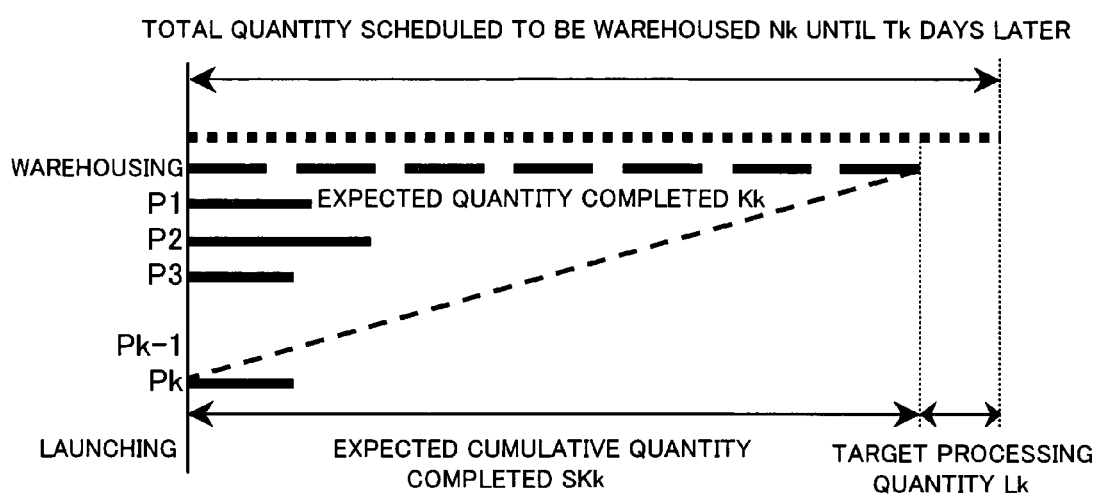
FIG. 1 is a conceptual diagram showing a method of production control according to a first embodiment of the invention.

A method of production control according to a first embodiment of the invention will be described with reference to FIGS. 1 to 3. In the present embodiment, a target processing quantity for each process is calculated with demand changes reflected in a warehousing plan even when the demand changes are great or not smoothed for each product type. FIG. 1 is a conceptual diagram showing the method of production control of the present embodiment. As shown in FIG. 1, in a production line including a plurality of processes, the processes are represented by P1, P2, . . . , P(k−1), Pk, . . . (or represented by Pn (n=1, 2, . . . , k−1, k, . . . ) in the order of their closeness to warehousing (shipment). It is assumed that lead time from (the launching of) the process Pk up to warehousing is represented by Tk (days) and that a total quantity scheduled to be warehoused since the starting day (today) until after the lead time Tk passes is represented by Nk (units; indicated by the thick line with many breaks in FIG. 1). The yield of the process Pk is represented by $\eta k$, and the quantity of work in process at the process Pk is represented by Sk (units). An expected quantity completed, which will contribute to warehousing, among the work in process Sk at the process Pk is represented by Kk (units; indicated by a thick solid line in FIG. 1). The expected quantity completed Kk at each process Pk can be calculated by $Kk = Sk \times \eta k \times \eta (k-1) \times \ldots \times \eta 1$. Therefore, an expected cumulative quantity completed SKk (units; indicated by the thick line with less breaks in FIG. 1), which will contribute to warehousing, among work in process which has passed through the process Pk (i.e., work in process S1 to S(k−1) at processes P1 to P(k−1), respectively) is obtained by:

$$SKk = \sum_{i=1}^{k-1} Ki = \sum_{i=1}^{k-1} (Si \times \eta i \times \eta(i-1) \times \cdots \times \eta 1)$$

A comparison is now made between the total quantity Nk scheduled to be warehoused until after the lead time Tk passes and the expected cumulative quantity completed SKk. When the total quantity Nk scheduled to be warehoused is greater than the expected cumulative quantity completed SKk (Nk>SKk), the difference between the total quantity Nk scheduled to be warehoused and the expected cumulative quantity completed SKk constitutes today's target processing quantity (quantity to be launched) Lk (units) for the process Pk(Lk=Nk−SKk). When the difference between the total quantity Nk scheduled to be warehoused is equal to or smaller than the expected cumulative quantity completed SKk (Nk≦SKk), since no processing is required at the process Pk today, the target processing quantity Lk is set at 0 (Lk=0). In summary, the following equations hold true.

$Lk=Nk-SKk(Nk>SKk)$ $Lk=0(Nk\leq SKk)$

When a target processing quantity Lk is set for each process Pk as thus described, the quantity of work in process Sk at each process Pk naturally approaches a proper value, and processing can be performed free of wastefulness with respect to the shipping schedule.

A method of production for obtaining a target processing quantity Lk for each process Pk from a quantity scheduled to be warehoused using the yield, the quantity of work in process, and the lead time as described above is hereinafter referred to as a pull production method. The method of production control according to the present embodiment will now be specifically described.

First, a description will be made on the manufacture of a product type A for which demand is substantially smoothed. FIG. 2 shows steps for calculating target processing quantities for the product type A using the present embodiment. In the present embodiment, it is not essential that target processing quantities are set for every process. Specifically, there is no need for setting any particular target processing quantity for a process having a surplus in production capacity because the process is only required to process work in process delivered from the preceding process in a dependent manner on a simple first-in first-out basis. In the present embodiment, it is assumed that the product type A is manufactured through processes P9 to P1 and that the process P1 is the process directly preceding storage in a shipping warehouse. It is also assumed that processes P1, P3, P6, and P9 are processes for which target processing quantities are to be set among the processes P1 to P9 and that processes P2, P4, P5, P7, and P8 are dependent processes for which no target processing quantity is required to be set. For simplicity, it is assumed that yields $\eta 1$ to $\eta 9$ of the processes P1 to P9, respectively, are 100% (Kk=Sk). It is also assumed that lead time from the completion of processing at the process P3 (process P3out) until the completion of processing at the process P1 (process P1out) is just one day; lead time from the completion of processing at the process P6 (process P6out) until the completion of processing at the process P1 (process P1out) is two days; and lead time from the completion of processing at the process P9 (process P9out) until the completion of processing at the process P1 (process P1out) is three days. That is, the daily processing capacity of the process P1 covers work in process at the process P1 and the process P2 preceding the same. The daily processing capacity of the process P3 covers work in process at the process P3 and the processes P4 and P5 preceding the same. The daily processing capacity of the process P6 covers work in process at the process P6 and the processes P7 and P8 preceding the same.

Figure 2:
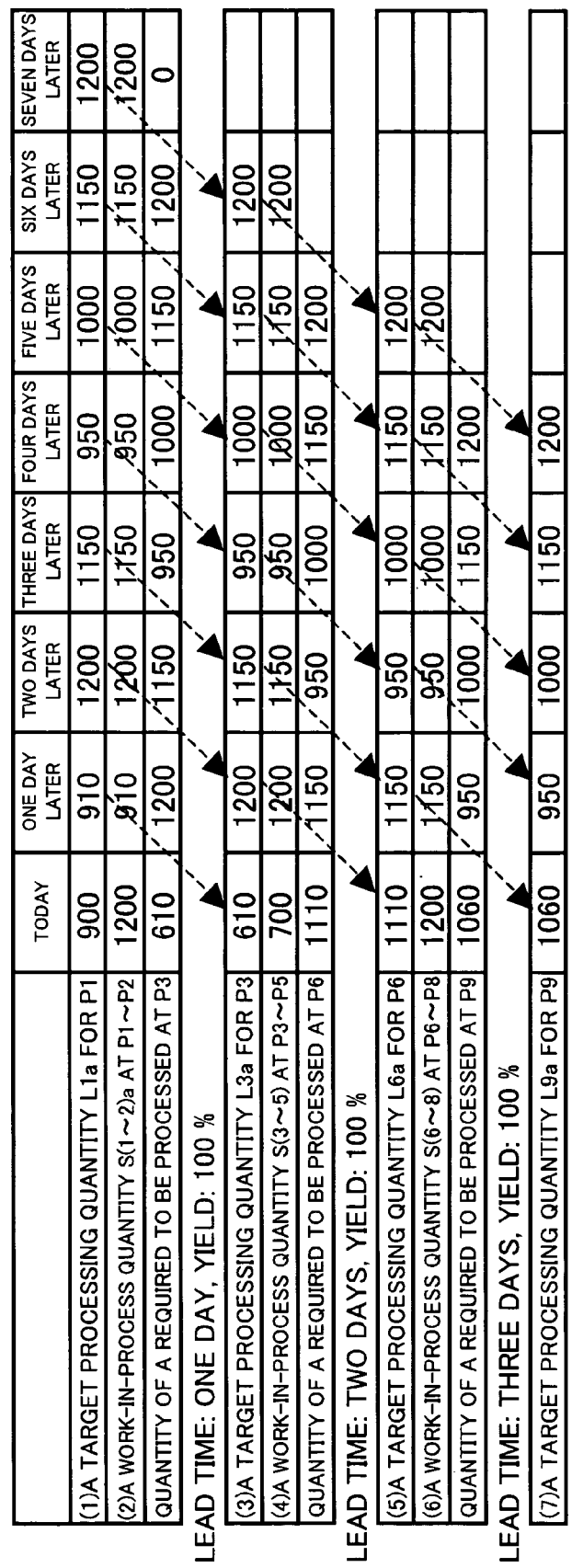
FIG. 2 shows steps for calculating a target processing quantity for a product type A using the method of production control according to the first embodiment of the invention.

As shown in FIG. 2, scheduled warehousing quantities for the product A until seven days later are set as target processing quantities L1a for the product type A at the process P1 (a target processing quantity of the product A is hereinafter referred to as "an A target processing quantity) (line (1) in FIG. 2). For example, a scheduled quantity of 900 is set for warehousing of the product type A of today, and a scheduled quantity of 910 is set for warehousing of tomorrow (one day later). Hereinafter, today's A target processing quantity for the process P1 may be represented by L1a0, and the A target processing quantity to be processed at the process P1 n days later may be represented by L1an. For example, the quantity of work in process of the product type A at the processes P1 and P2 (a quantity of work in process of the product type A will be hereinafter referred to as "A work-in-process quantity"), which is represented by S(1-2)a, is 1200 this morning (line (2) in FIG. 2). Hereinafter, today's A work-in-process quantity at the processes P1 and P2 may be represented by S(1-2)a0, and the A work-in-process quantity at the processes P1 and P2 n days later may be represented by S(1-2)an.

First, today's A target processing quantity L3a0 for the process P3 is obtained. In order to process the today's A target processing quantity L1a0 (=900 units) plus the tomorrow's A target processing quantity L1a1 (=910 units) at the process P1, at least a predetermined quantity of work in process must be fed from the process P3 to the process P2 before tomorrow morning. The quantity required to be processed at the process P3 for this purpose is a value obtained by subtracting the today's A work-in-process quantity S(1-2)a0 at the processes P1 and P2 from the sum of the A target processing quantities L1a0 and L1a1 of today and tomorrow (L1a0+L1a1−S(1-2)a0=900+910−1200=610). Thus, the A target processing quantity L3a0 for the process P3 of today (from this morning until tomorrow morning) is 610 which is equal to the quantity of the product type A required to be processed today at the process P3 (line (3) in FIG. 2). The today's A target processing quantity L3a0 for the process P3 is the quantity to be processed at process P1 tomorrow (from tomorrow morning until the morning of the day after tomorrow). In FIG. 2, This is indicated by the arrow in a broken line extending from the tomorrow's A target processing quantity L1a1 for the process P1 toward the today's A target processing quantity L3a0 for the process P3.

Next, tomorrow's A work-in-process quantity (expected work-in-process quantity) S(1-2)a1 at the processes P1 and P2 and tomorrow's A target processing quantity L3a1 for the process P3 are obtained. The A work-in-process quantity S(1-2)a1 at the processes P1 and P2 expected tomorrow morning is a value obtained by subtracting the today's A target processing quantity L1a0 for the process P1 from the today's A work-in-process quantity S(1-2)a0 at the processes P1 and P2 and adding the today's A target processing quantity L3a0 for the process P3 to the result (S(1-2)a1=S(1-2)a0−L1a0+L3a0). That is, the tomorrow's expected A work-in-process quantity S(1-2)a1 at the processes P1 and P2 is 910 (=1200−900+610). The quantity of the product type A to be processed tomorrow at the process P3 is a value obtained by subtracting the tomorrow's expected A work-in-process quantity S(1-2)a1 at the processes P1 and P2 from the sum of the A target processing quantities L1a1 and L1a2 of tomorrow and the day after tomorrow (L1a1+L1a2−S(1-2)a1=910+1200−910=1200). Thus, the tomorrow's A target processing quantity L3a1 for the process P3 is 1200 which is equal to the quantity of the product type A required to be processed at the process P3 tomorrow. The tomorrow's A target processing quantity L3a1 for the process P3 is the quantity of the product type A to be processed at the process P1 the day after tomorrow. In FIG. 2, This is indicated by the arrow in a broken line extending from the A target processing quantity L1a2 to be processed at the process P1 the day after tomorrow toward the tomorrow's A target processing quantity L3a1 for the process P3.

An A work-in-process quantity S(1-2)a2 expected at the processes P1 and P2 in the morning of the day after tomorrow is a value obtained by subtracting the tomorrow's A target processing quantity L1a1 for the process P1 from the tomorrow's expected A work-in-process quantity S(1-2)a1 at the processes P1 and P2 and adding the tomorrow's A target processing quantity L3a1 for the process P3 to the result (S(1-2)a2=S(1-2)a1−L1a1+L3a1). That is, the A work-in-process quantity S(1-2)a2 expected the day after tomorrow at the processes P1 and P2 is 1200 (=910−910+1200). It is possible to similarly obtain A target processing quantities L3a2 to L3a6 to be processed at the process P3 on the second through sixth days from today and to obtain A work-in-process quantities S(1-2)a3 to S(1-2)a7 expected on the third through seventh days from today at the processes P1 and P2. It is also possible to similarly obtain A work-in-process quantities S(3-5)a at the processes P3 to P5 (line (4) in FIG. 2), an A target processing quantity L6a for the process P6 (line (5) in FIG. 2), A work-in-process quantities S(6-8)a at the processes P6 to P8 (line (6) in FIG. 2), and an A target processing quantity L9a for the process P9 (line (7) in FIG. 2).

A description will now be made on the manufacture of a product type B for which demand is not smoothed. FIG. 3 shows a method of calculating target processing quantities for the product type B using the present embodiment. It is assumed that the product type B is manufactured through processes P9 to P1 similarly to the product type A. As shown in FIG. 3, scheduled quantities of the product type B to be warehoused until seven days later are set as target processing quantities L1b of the product type B to be processed at the process P1 (a target processing quantity for the product type B is hereinafter referred to as "a B target processing quantity"). For example, a scheduled quantity of the product type B to be warehoused today is 200; a scheduled quantity to be warehoused tomorrow is 200; and a scheduled quantity to be warehoused the day after tomorrow is 0 (line (1) in FIG. 3). For example, the quantity of work in process of the product type B at the processes P1 and P2 (represented by S(1-2)b) is 250 this morning (a quantity of work in process of the product type B is hereinafter referred to as "a B work-in-process quantity). See line (2) in FIG. 3.

First, today's B target processing quantity L3b0 for the process P3 is obtained. In order to process today's B target processing quantity L1b0 (=200 units) plus tomorrow's B target processing quantity L1b1 (=200 units) at the process P1, at least a predetermined quantity of work in process must be fed from the process P3 to the process P2 before tomorrow morning. The quantity required to be processed at the process P3 for this purpose is a value obtained by subtracting today's B work-in-process quantity S(1-2)b0 at the processes P1 and P2 from the sum of B target processing quantities L1b0 and L1b1 of today and tomorrow (L1b0+L1b1−S(1-2)b0=200+200−250=150). Thus, the B target processing quantity L3b0 for the process P3 of today is 150 which is equal to the quantity of the product type B required to be processed today at the process P3 (line (3) in FIG. 3).

Next, tomorrow's B work-in-process quantity (expected work-in-process quantity) S(1-2)b1 at the processes P1 and P2 and tomorrow's B target processing quantity L3b1 for the process P3 are obtained. The B work-in-process quantity S(1-2)b1 at the processes P1 and P2 expected tomorrow morning is a value obtained by subtracting the today's B target processing quantity L1b0 for the process P1 from the today's B work-in-process quantity S (1-2)b0 at the processes P1 and P2 and adding the today's B target processing quantity L3b0 for the process P3 to the result (S(1-2)b1=S(1-2)b0−L1b0+L3b0). That is, the tomorrow's expected B work-in-process quantity S(1-2)b1 at the processes P1 and P2 is 200 (=250−200+150). The quantity of the product type B required to be processed tomorrow at the process P3 is a value obtained by subtracting the tomorrow's expected B work-in-process quantity S(1-2)b1 from the sum of the B target processing quantities L1b1 and L1b2 of tomorrow and the day after tomorrow (L1b1+L1b2−S(1-2)b1=200+0−200=0). Thus, the tomorrow's B target processing quantity L3b1 for the process P3 is 0 which is equal to the quantity of the product type B required to be processed at the process P3 tomorrow.

A B work-in-process quantity S(1-2)b2 expected at the processes P1 and P2 in the morning of the day after tomorrow is a value obtained by subtracting the tomorrow's B target processing quantity L1b1 for the process P1 from the tomorrow's expected B work-in-process quantity S(1-2)b1 at the processes P1 and P2 and adding the tomorrow's B target processing quantity L3b1 for the process P3 to the result (S(1-2)b2=S(1-2)b1−L1b1+L3b1). That is, the B work-in-process quantity S(1-2)b2 expected the day after tomorrow at the processes P1 and P2 is 0 (=200−200+0). It is possible to similarly obtain B target processing quantities L3b2 to L3b6 to be processed at the process P3 on the second through sixth days from today and to obtain B work-in-process quantities S(1-2)b3 to S(1-2)b7 expected on the third through seventh days from today at the processes P1 and P2. It is also possible to similarly obtain B work-in-process quantities S(3-5)b at the processes P3 to P5 (line (4) in FIG. 3), a B target processing quantity L6b for the process P6 (line (5) in FIG. 3), B work-in-process quantities S(6-8)b at the processes P6 to P8 (line (6) in FIG. 3), and a B target processing quantity L9b for the process P9 (line (7) in FIG. 3).

As thus described, according the present embodiment, target quantities Lk to be processed at each process Pk using the pull production method can be obtained even for the product type B for which demand is not smoothed in a manner similar to that used for the product type A for which demand is smoothed.

Second Embodiment

A method of production control according to a second embodiment of the invention will now be described with reference to FIGS. 4 to 6. In the present embodiment, a target processing quantity for a bottleneck process or restricted process is calculated as described below in order to run the bottleneck process or restricted process to its maximum capacity. The term "bottleneck process" as used here means a process which determines the throughput of a production line as a whole when each process of the line demonstrates its performance as planned, and the term "restricted process" means a process which determines the throughput of a production line as a whole under certain conditions. Hereinafter, it is assumed that the term "bottleneck process" implies a bottleneck process or restricted process. First, a minimum target processing quantity Lkmin is calculated for a process Pk which is a bottleneck process using steps similar to those for calculating a target processing quantity Lk in the first embodiment. Specifically, the minimum target processing quantity Lkmin for the process Pk, which is a bottleneck process, is calculated using the following equation.

$$Lk\mathrm{min}=Nk-SKk(Nk>SKk)$$

$$Lk\mathrm{min}=0(Nk \leq SKk)$$

When the minimum target processing quantity Lkmin itself is set as the target processing quantity Lk, the target processing quantity Lk may be smaller than a maximum processing capacity Mk of the process Pk. Since the bottleneck process Pk must be run to its maximum capacity in order to improve the throughput of the production line as a whole, a value obtained by adding the surplus capacity of the process Pk to the minimum target processing quantity Lkmin is set as the target processing quantity Lk for the process Pk. The method of production control according to the present embodiment will be specifically described below.

Figure 4:
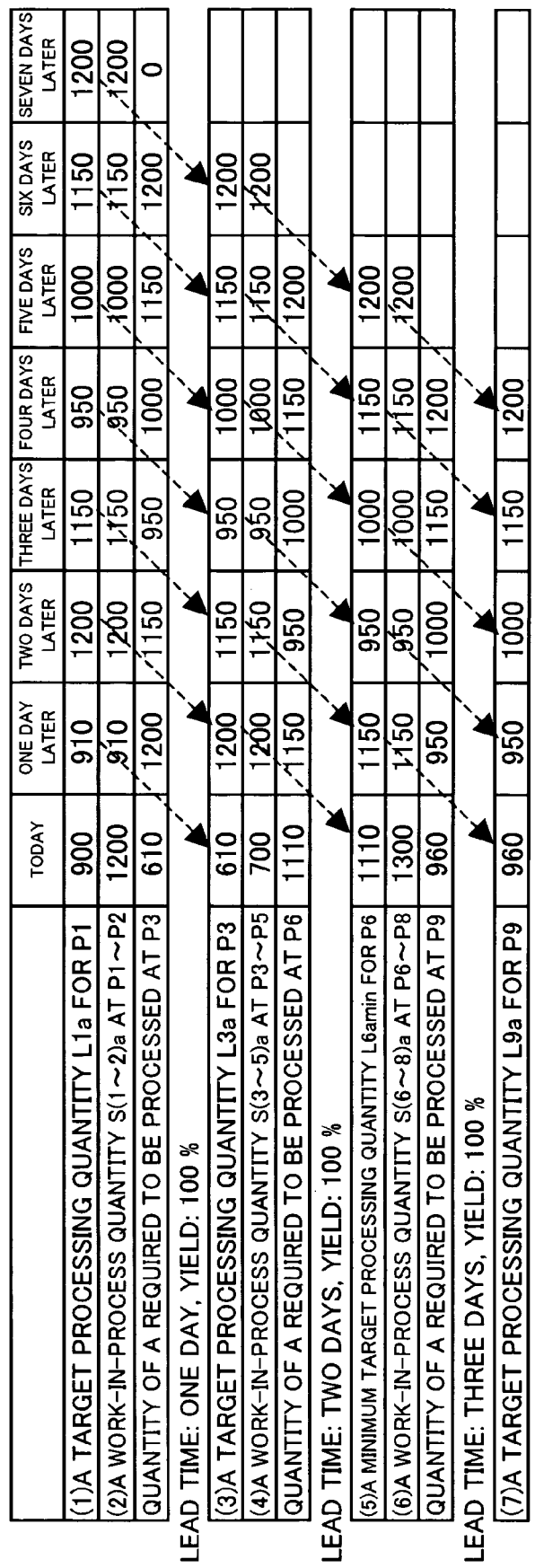
FIG. 4 shows steps for calculating a minimum target processing quantity for the product type A at a bottleneck process using the method of production control according to a second embodiment of the invention.

FIG. 4 shows steps for calculating target processing quantities for the product A and minimum target processing quantities for the product A at a bottleneck process (hereinafter referred to as "A minimum target processing quantities"). FIG. 5 shows steps for calculating target processing quantities for the product B and minimum target processing quantities for the product B at a bottleneck process (hereinafter referred to as "B minimum target processing quantities"). The present embodiment will be described with reference to an example of a production line which is similar to the production line described in the first embodiment except that a process P6 is a bottleneck process. First, steps similar to those in the first embodiment are taken to obtain A target processing quantities L3a for a process P3 (line (3) in FIG. 4), A minimum target processing quantities L6amin for the process P6 which is a bottleneck process (line (5) in FIG. 4), and A target processing quantities L9a for a process P9 (line (7) in FIG. 4).

Figure 5:
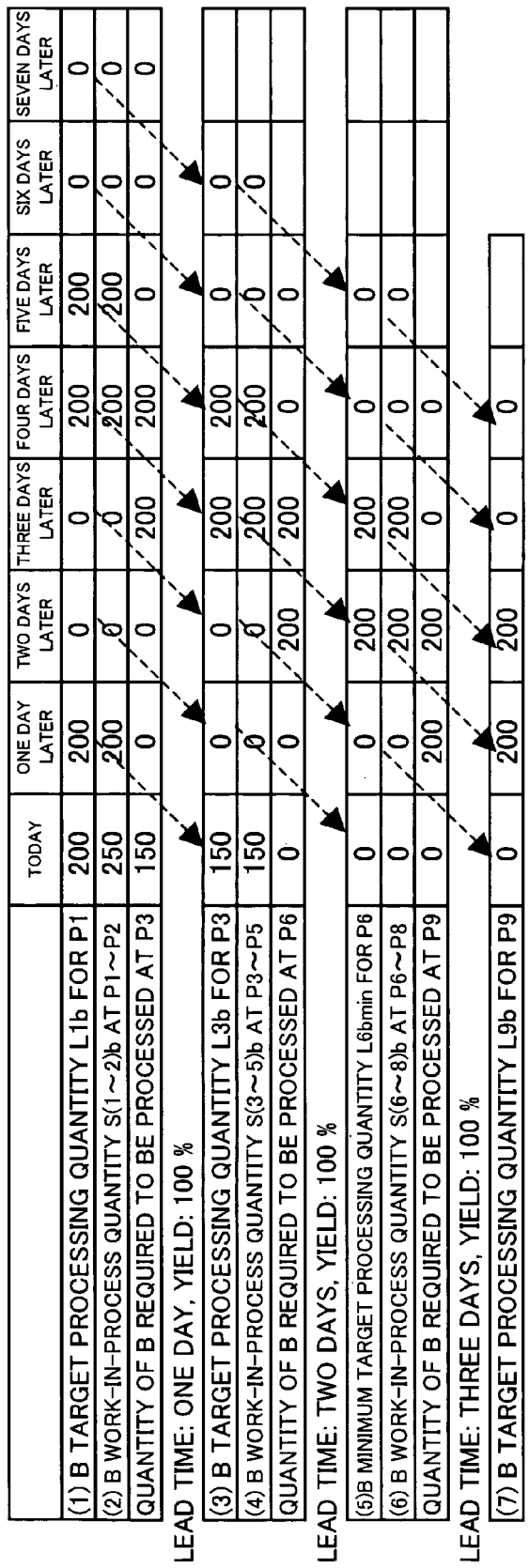
FIG. 5 shows steps for calculating a minimum target processing quantity for the product type B at a bottleneck process using the method of production control according to the second embodiment of the invention.
Figure 6:
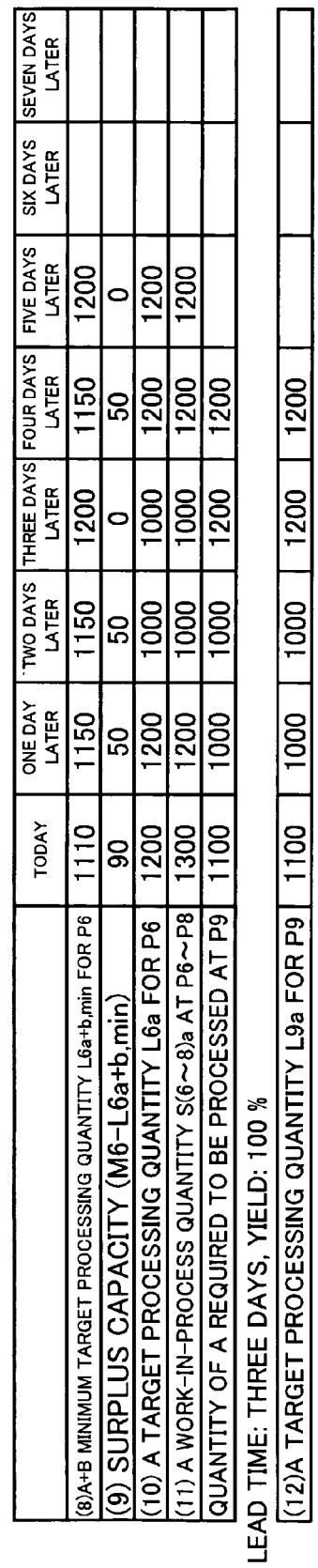
FIG. 6 shows steps for calculating a target processing quantity for the product type A at a bottleneck process using the method of production control according to the second embodiment of the invention.

Next, steps similar to those in the first embodiment are taken to obtain B target processing quantities L3b for the process P3 (line (3) in FIG. 5), B minimum target processing quantities L6bmin for the process P6 which is a bottleneck process (line (5) in FIG. 5), and B target processing quantities L9b for the process P9 (line (7) in FIG. 5).

Next, A target processing quantities L6a for the process P6 are obtained based on the A minimum target processing quantities L6amin and the B minimum target processing quantities L6bmin for the process P6. FIG. 6 shows steps for calculating the A target processing quantities L6a for the process P6 and A target processing quantities L9a for the process P9 reflecting corrections which are made based on the quantities L6a. First, a calculation is performed to obtain A+B minimum target processing quantities L6a+b,min which are the sums of the A minimum target processing quantities L6amin and the B minimum target processing quantities L6bmin (line (8) in FIG. 6). Today's A+B minimum target processing quantity L6a+b,min0 for the process P6 is 1110 (=1110+0).

Next, a surplus capacity of the process P6 is calculated. The surplus capacity of the process P6 is the difference between the maximum processing capacity M6 of the process P6 and an A+B minimum target processing quantity L6a+b,min. For simplicity, it is assumed that the maximum processing capacity M6 of the process P6 is 1200 units/day regardless of product types. Then, the surplus capacity of the process P6 of today is 90 (=1200−1110) units (line (9) in FIG. 6). In order to run the process P6, which is a bottleneck process, to its maximum capacity, a value obtained by adding 90 constituting the surplus capacity to the A minimum target processing quantity L6amin is set as the A target processing quantity L6a. Specifically, today's A target processing quantity L6a0 for the process P6 is 1200 (=1110+90). See line (10) in FIG. 6. It is assumed that the B target processing quantity L6b for the process P6 is 0 which is equal to the B minimum target processing quantity L6bmin. The reason for adding the 90 units constituting the surplus capacity of the process P6 only to the quantity of the product type A is as follows. Since work in process of the product type A, which is the main product type, is present in a quantity greater than that of the product type B at each process, a target processing quantity for the product type A can be more easily adjusted at each process than that for the product type B.

Next, expected A work-in-process quantities S(6-8)a at the processes P6 to P8 for tomorrow and afterward and the A target processing quantities L9a at the process P9 are corrected based on the A target processing quantities L6a for the process P6. Today's A target processing quantity L9a0 for the process P9 is 1100 because it is a value obtained by subtracting today's A work-in-process quantity S(6-8)a0 at the processes P6 to P8 from the sum of A target processing quantities L6a0 and L6a1 of the process P6 for today and tomorrow (=1200+1200−1300). See line (12) in FIG. 6. Tomorrow's expected A work-in-process quantity S(6-8)a1 at the processes P6 to P8 is 1200 because it is a value obtained by subtracting the today's A target processing quantity L6a0 for the process P6 from the today's A work-in-process quantity S(6-8)a0 at the processes P6 to P8 and adding the today's A target processing quantity L9a0 for the process P9 to the result (=1300−1200+1100). See line (11) in FIG. 6.

In the present embodiment, a target processing quantity Lk can be obtained according to the pull production method such that a process Pk, which is a bottleneck process, can be run to its maximum capacity. Therefore, the present embodiment makes it possible to improve the throughput of a production line as a whole.

Third Embodiment

A method of production control according to a third embodiment of the invention will now be described with reference to FIGS. 7 to 9. In the present embodiment, a target processing quantity for each process is calculated such that work-in-process within a processable range will be processed at a bottleneck process to its maximum capacity. FIG. 7 shows steps for calculating A target processing quantities and A minimum target processing quantities at a bottleneck process. FIG. 8 shows steps for calculating B target processing quantities and B minimum target processing quantities at a bottleneck process. First, steps similar to those in the second embodiment are taken to obtain A target processing quantities L3a and L9a for processes P3 and P9, A minimum target processing quantities L6amin for the process P6 which is a bottleneck process, B target processing quantities L3b and L9b for the processes P3 and P9, and B minimum target processing quantities L6bmin for the process P6.

Next, A target processing quantities L6a for the process P6 are obtained based on the A minimum target processing quantities L6amin and the B minimum target processing quantities L6bmin for the process P6. FIG. 9 shows steps for calculating the A target processing quantities L6a for the process P6 and A target processing quantities L9a for the process P9 reflecting corrections which are made based on the quantities L6a. First, a calculation is performed to obtain A+B minimum target processing quantities L6a+b,min which are the sums of the A minimum target processing quantities L6amin and the B minimum target processing quantities L6bmin (line (8) in FIG. 9). Today's A+B minimum target processing quantity L6a+b,min0 for the process P6 is 1110 (=1110+0).

Next, a surplus capacity of the process P6 is calculated. The surplus capacity of the process P6 is the difference between a maximum processing capacity M6 of the process P6 and an A+B minimum target processing quantity L6a+b,min. For simplicity, it is assumed that the process P6 has a processing capacity of 1200 units/day regardless of product types. Then, the surplus capacity of the process P6 of today is 90 (=1200−1110) units (line (9) in FIG. 9). In order to run the process P6, which is a bottleneck process, to its maximum capacity, a value obtained by adding 90 constituting the surplus capacity to the A minimum target processing quantity L6amin is set as an A target processing quantity L6a'. Specifically, today's A target processing quantity L6a0' for the process P6 is 1200 (=1110+90). See line (10) in FIG. 9.

Let us now discuss the quantity of work in process (processable work-in-process quantity) SMk which can be processed by a process Pk, taking lead times into consideration, in a unit period (one day) for which a target is to be set. Since there is a lead time of one day between the process P9 and the process P6, work in process delivered from the process P9 cannot be processed at the process P6 on the day even if there is no limit on the processing capacity of the process P6. The range of work in process which can be processed at the process P6 on the day covers only work in process at the processes P6 to P8. Therefore, the quantity of work in process of the product type A which can be processed at the process P6 (A processable work-in-process quantity) SM6a is equal to the quantity of A work in process S(6-8)a at the processes P6 to P8 (line (11) in FIG. 9). Let us now compare the A target processing quantities L6a' at the process P6 and the A work-in-process quantities S(6-8)a (the A processable work-in-process quantities SM6a at the process P6) at the processes P6 to P8. The today's A target processing quantity L6a0' for the process P6 is 1200, whereas today's A work-in-process quantity S(6-8)a0 at the processes P6 to P8 (today's A processable work-in-process quantity SM6a0 at the process P6) is 1150. Therefore, the today's A target processing quantity L6a0' is corrected to 1150 units which can be actually processed, and the corrected value is set as an A target processing quantity L6a0 (line (12) in FIG. 9).

Next, expected A work-in-process quantities S(6-8)a at the processes P6 to P8 for tomorrow and afterward and the A target processing quantities L9a at the process P9 are corrected based on the A target processing quantities L6a for the process P6. Today's A target processing quantity L9a0 for the process P9 (the quantity of the product type A which must be fed from the process P9 to the process P8 today) is 1200 because it is a value obtained by subtracting today's A work-in-process quantity S(6-8)a0 at the processes P6 to P8 from the sum of A target processing quantities L6a0 and L6a1 of the process P6 for today and tomorrow (=1150+1200−1150). See line (13) in FIG. 9. Tomorrow's expected A work-in-process quantity S(6-8)a1 at the processes P6 to P8 is 1200 because it is a value obtained by subtracting the today's A target processing quantity L6a0 for the process P6 from the today's A work-in-process quantity S(6-8)a0 at the processes P6 to P8 and adding the today's A target processing quantity L9a0 for the process P9 to the result (=1150−1150+1200). See line (11) in FIG. 9.

In the present embodiment, a target processing quantity Lk can be obtained according to the pull production method such that a process Pk, which is a bottleneck process, can be run to its maximum capacity within a range of work in process that can be actually processed. Therefore, the present embodiment makes it possible to improve the throughput of a production line as a whole.

Fourth Embodiment

Figure 11:
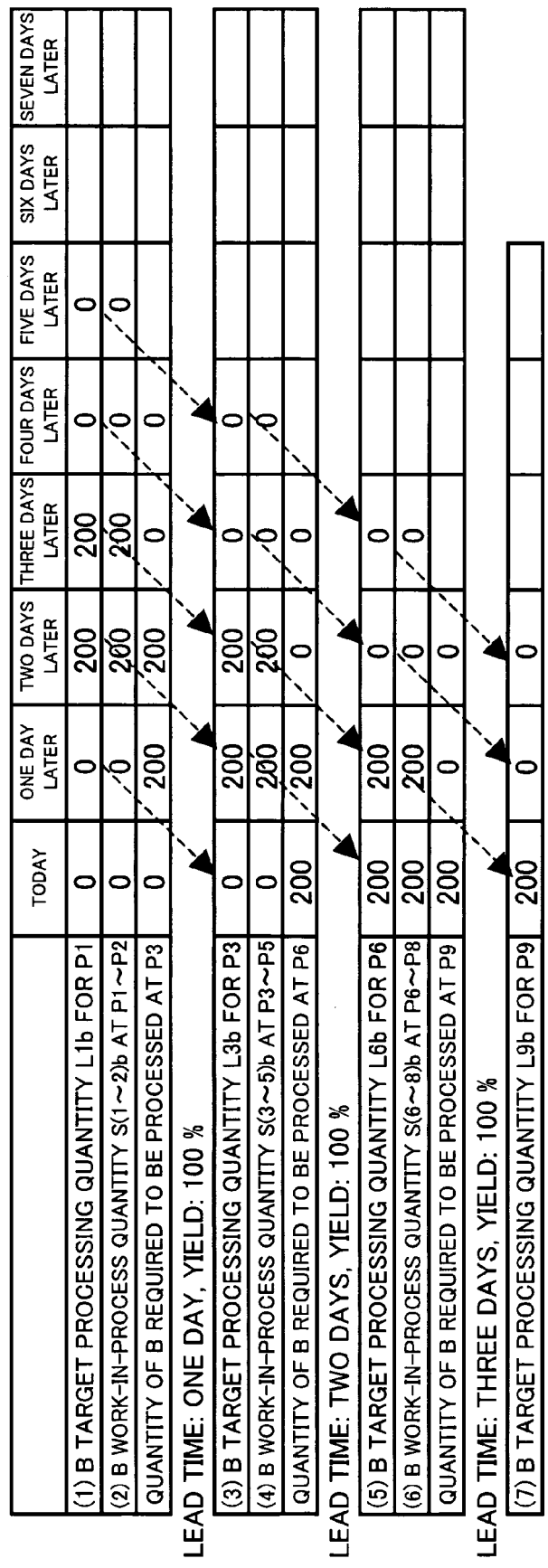
FIG. 11 shows steps for calculating a target processing quantity for the product type B at a process other than a bottleneck process using the method of production control according to the fourth embodiment of the invention.

A method of production control according to a fourth embodiment of the invention will now be described with reference to FIGS. 10 and 11. FIGS. 10 and 11 show steps for calculating target processing quantities for processes which are upstream of a bottleneck process and which are not a bottleneck, when the pull production method is applied to the bottleneck process. The table shown in FIG. 10 is similar to the table shown in FIG. 2 except for the values written (input) in the boxes, and the table shown in FIG. 11 is similar to the table shown in FIG. 3 except for the values written (input) in the boxes.

For example, steps similar to those in the second or the third embodiment are taken to set A target processing quantities for the bottleneck process for six days starting today, respectively. Next, the A target processing quantities for the bottleneck process are written in the boxes for A target processing quantities L1a for the process P1 in the table shown in FIG. 10 (line (1)). Next, steps similar to those in the first embodiment are taken to set A target processing quantities for processes preceding the bottleneck process, respectively. The values obtained as "A target processing quantities L3a for P3" in FIG. 10 are A target processing quantities for the process at a lead time of one day before the bottleneck process (line (3)). Similarly, the values obtained as "A target processing quantities L6a for P6" are A target processing quantities for the process at a lead time of two days before the bottleneck process (line (5)), and the values obtained as "A target processing quantities L9a for P9" are A target processing quantities for the process at a lead time of three days before the bottleneck process (line (7)).

Similarly, steps similar to those in the second or the third embodiments are taken to set B target processing quantities for the bottleneck process for six days starting today. Next, the B target processing quantities for the bottleneck process are written in the boxes for B target processing quantities L1b for the process P1 in the table shown in FIG. 11 (line (1)). Next, steps similar to those in the first embodiment are taken to set B target processing quantities for processes preceding the bottleneck process, respectively. The values obtained as "B target processing quantities L3b for P3" in FIG. 11 are B target processing quantities for the process at a lead time of one day before the bottleneck process (line (3)). Similarly, the values obtained as "B target processing quantities L6b for P6" are B target processing quantities for the process at a lead time of two days before the bottleneck process (line (5)), and the values obtained as "B target processing quantities L9b for P9" are B target processing quantities for the process at a lead time of three days before the bottleneck process (line (7)). That is, the present embodiment is substantially similar to the first embodiment except that the bottleneck process for which target processing quantities are set is substituted for the process P1 directly preceding warehousing.

In the present embodiment, it is possible to set target processing quantities for processes (not bottleneck processes), which are upstream of a bottleneck process, according to the pull production method similar to the first embodiment.

Fifth Embodiment

A method of production control according to a fifth embodiment of the invention will now be described with reference to FIGS. 12 to 14. In the present embodiment, where a plurality of bottleneck processes independent of each other (X1, X2, ...) exists, target processing quantities for the bottleneck process X1 are first set using steps similar to those in the second or the third embodiment such that the bottleneck process X1, which is the latest process, will be run for its maximum capacity. Next, target processing quantities are similarly set for the bottleneck process X2 which is the next process closest to shipment after the bottleneck process X1, where the bottleneck process X1 is treated like the process P1 described above. Thus, target processing quantities are sequentially set for the plurality of bottleneck processes starting with the latest process, which makes it possible to set target processing quantities for a preceding bottleneck process independently of the state of processing at a subsequent bottleneck process and to thereby allow each of the bottleneck processes to be run to its maximum capacity. It is therefore possible to solve the problem of influence of stoppage of a subsequent bottleneck process on the processing at a preceding bottleneck process.

FIGS. 12 to 14 show steps for calculating target processing quantities for processes including the bottleneck processes. The table shown in FIG. 12 is similar to the table shown in FIG. 4 except for the values written (input) in the boxes. The table shown in FIG. 13 is similar to the table shown in FIG. 5 except for the values written (input) in the boxes. The table shown in FIG. 14 is similar to the table shown in FIG. 6 except for the values written (input) in the boxes.

First, steps similar to those in the second or the third embodiment are taken to set A target processing quantities for the latest bottleneck process X1, for example, for six days starting today. Next, the A target processing quantities for the bottleneck process X1 are written in the boxes for A target processing quantities L1a for the process P1 in the table shown in FIG. 12 (line (1)). Next, steps similar to those in the first embodiment are taken to set A target processing quantities for processes preceding the bottleneck process X1, respectively. In the present embodiment, it is assumed that the bottleneck process X2, which is the next process closest to shipment after the process X1, is at a lead time of two days before the bottleneck process X1. Specifically, the values obtained as "A minimum target processing quantities L6amin for P6" in FIG. 12 are A minimum target processing quantities for the bottleneck process X2 at a lead time of two days before the bottleneck process X1 (line (5)). The values obtained as "A target processing quantities L3a for P3" in FIG. 12 are A target processing quantities for a process which is sandwiched between the bottleneck processes X1 and X2 and which is at a lead time of one day before the bottleneck process X1 (line (3)).

Similarly, steps similar to those in the second or the third embodiment are taken to set B target processing quantities for the bottleneck process X1, for example, for six days starting today. Next, the B target processing quantities for the bottleneck process X1 are written in the boxes for B target processing quantities L1b for the process P1 in the table shown in FIG. 13 (line (1)). Next, steps similar to those in the first embodiment are taken to set B target processing quantities for the processes preceding the bottleneck process X1, respectively. The values obtained as "B minimum target processing quantities L6bmin for P6" in FIG. 13 are B minimum target processing quantities for the bottleneck process X2 which is the next process closest to shipment after the bottleneck process X1 (line (5)). The values obtained as "B target processing quantities L3b for P3" in FIG. 13 are B target processing quantities for the process which is sandwiched between the bottleneck processes X1 and X2 and which is at a lead time of one day before the bottleneck process X1 (line (3)).

Next, A target processing quantities for the bottleneck process X2 are obtained based on the A minimum target processing quantities and the B minimum target processing quantities for the bottleneck process X2. First, a calculation is performed to obtain A+B minimum target processing quantities which are the sums of the A minimum target processing quantities and the Bminimum target processing quantities for the bottleneck process X2 (line (8) in FIG. 14). Today's A+B minimum target processing quantity for the bottleneck process X2 is 1150 (=950+200).

Next, a surplus capacity of the bottleneck process X2 is calculated. The surplus capacity of the bottleneck process X2 is the difference between a maximum processing capacity of the bottleneck process X2 and an A+B minimum target processing quantity. For simplicity, it is assumed that the maximum processing capacity of the bottleneck process X2 is 1200 units/day regardless of product types. Then, today's surplus capacity of the bottleneck process X2 is 50 (=1200−1150). See line (9) in FIG. 14. In order to run the bottleneck process X2 to its maximum capacity, a value obtained by adding 50 constituting the surplus capacity to the A minimum target processing quantity is set as an A target processing quantity for the bottleneck process X2. Specifically, today's A target processing quantity for the bottleneck process X2 is 1000 (=950+50). See line (10) in FIG. 14. It is assumed that a B target processing quantity for the bottleneck process X2 is 200 which is equal to the B minimum target processing quantity. The reason for adding the 50 units constituting the surplus capacity of the bottleneck process X2 only to the quantity of the product type A is as follows. Since work in process of the product type A, which is the main product type, is present in a quantity greater than that of the product type B at each process, a target processing quantity for the product type A can be more easily adjusted at each process than that for the product type B.

The above-described steps are repeated to set target processing quantities for the plurality of bottleneck processes sequentially starting with the process closest to shipment to set a target processing quantity for the process sandwiched by the bottleneck processes.

In the present embodiment, target processing quantities can be set for a plurality of bottleneck processes using the pull production method in a way similar to that in the second embodiment. Since the target processing quantities are sequentially set for the plurality of bottleneck processes starting with the subsequent process, the target processing quantities for the preceding bottleneck process can be set independently of the state of processing at the subsequent bottleneck process, which allows each of the bottleneck processes to be run to its maximum capacity. It is therefore possible to solve the problem of influence of stoppage of a subsequent bottleneck process on the processing at a preceding bottleneck process.

In the present embodiment, it is also possible to set target processing quantities for process(es) sandwiched between bottleneck processes using the pull production method based on target processing quantities for the subsequent bottleneck process which is closest to the process(es).

Sixth Embodiment

A method of production control according to a sixth embodiment of the invention will now be described with reference to FIGS. 15 and 16. FIG. 15 shows A target processing quantities L1a for the process P1 directly preceding warehousing and A target processing quantities L6a for the process P6 which is a bottleneck process in the second embodiment, and the figure also shows differences D61a (=L6a−L1a) between the A target processing quantities L6a and the A target processing quantities L1a. As shown, an A target processing quantity L6a for the process P6, which is a bottleneck process, may be greater than an A target processing quantity L1a (a schedule quantity to be warehoused) for the process P1. On a day when the difference D61a between the A target processing quantities is positive (D61a>0), the product A is accumulated in a pre-shipment warehouse located immediately after the process P1 in a quantity equivalent to the difference D61a between the A target processing quantities.

FIG. 16 shows A target processing quantities (L1a) for the bottleneck process X1 and A target processing quantities (L6a) for the bottleneck process X2 which is closer to the launching side than the bottleneck process X1, and the figure also shows differences D61a (=L6a−L1a) between the A target processing quantities L6a and the A target processing quantities L1a. On a day when the difference D61a between the A target processing quantities is positive (D61a>0), the product A is temporarily accumulated in an intermediate warehouse located between the bottleneck processes X1 and X2 in a quantity equivalent to the difference D61a between the A target processing quantities. On the contrary, on a day when the difference D61a between the A target processing quantities is negative (D61a<0), the product A in the intermediate warehouse is advanced in a quantity equivalent to the absolute value of the difference D61a between the A target processing quantities (|D61a|). As thus described, in the present embodiment, a pre-shipment warehouse or intermediate warehouse having a buffering function is provided. A process other than bottleneck processes can accommodate some additional processing load because it has a margin in processing capacity. It is therefore possible to solve the problem of influence of stoppage of a subsequent bottleneck process on the processing at a preceding bottleneck process.

Seventh Embodiment

A method of production control according to a seventh embodiment of the invention will now be described. Let us now assume that, in a production line including processes P1 to P12, the process P1 is the process directly preceding warehousing and the processes P6 and P11 are bottleneck processes. An intermediate warehouse is provided after the process P9, and a pre-shipment warehouse is provided immediately after the process P1. In the present embodiment, the total quantity of work in process on the entire production line including the pre-shipment warehouse and the intermediate warehouse is monitored. Alternatively, the production line may be divided into a plurality of units, and the total quantity of work in process in each of the units may be monitored. The total quantity of work in process is to be prevented from exceeding a predetermined value. For example, let us assume that Y1 represents the total quantity of work in process in the range from the process P1 to the process P8 including the pre-shipment warehouse and that Y2 represents the total quantity of work in process in the range from the process P9 to the process P12 including the intermediate warehouse. The total quantities Y1 and Y2 of work in process are monitored, and the launching of units from the intermediate warehouse to the process P8 is stopped when the total work-in-process quantity Y1 is about to exceed, for example, 12000. The launching of units to the process P12 is stopped at the launching port when the total work-in-process quantity Y2 is about to exceed, for example, 18000. As thus described, the quantity of work in process on a production line as a whole or in a divisional unit of the line can be controlled such that it will not exceed a certain limit.

Eighth Embodiment

A method of production control according to an eighth embodiment of the invention will now be described with reference to FIG. 17. In the present embodiment, a target processing quantity for each process is calculated with demand changes reflected in a warehousing plan even when the demand changes are great or not smoothed for each product type using the pull production method. Further, a comparison is made between a cumulative target processing quantity and a cumulative quantity actually produced from the starting point of a plan to evaluate lead and delay of processing of each product type. It is assumed that lead time of a product type u from the launching of a process Pk up to warehousing is represented by Tuk (days) and that a total quantity of the product u scheduled to be warehoused since the starting day of a plan until after the lead time Tuk passes is represented by Nuk (units). The yield of the product type u at the process Pk is represented by $\eta uk$, and the quantity of work in process of the product type u at the process Pk is represented by Suk (units). An expected quantity completed, which will contribute to warehousing, among the work in process Suk of the product type u at the process Pk is represented by Kuk (units). The expected quantity completed Kuk of the product type u at the process Pk can be calculated by Kuk=Suk×$\eta$k× $\eta$(k−1)× . . . ×$\eta$1. Therefore, an expected cumulative quantity completed SKuk (units), which will contribute to warehousing, among work in process of the product type u which has passed through the process Pk (i.e., work in process of the product type u Su1 to Su(k−1) at processes P1 to P(k−1)) is obtained by:

$$SKuk = \sum_{i=1}^{k-1} Kui = \sum_{i=1}^{k-1} (Sui \times \eta ui \times \eta u(i-1) \times \cdots \times \eta u1)$$

A comparison is now made between the total quantity Nuk of the product type u scheduled to be warehoused until after the lead time Tuk passes and the expected cumulative quantity completed SKuk. When the total quantity Nuk scheduled to be warehoused is greater than the expected cumulative quantity completed SKuk (Nuk>SKuk), the difference between the total quantity Nuk scheduled to be warehoused and the expected cumulative quantity completed SKuk constitutes today's target processing quantity Luk (units) of the product type u for the process Pk (Luk=Nuk−SKuk). When the total quantity Nuk scheduled to be warehoused is equal to or smaller than the expected cumulative quantity completed SKuk (Nuk≦SKuk), since no processing is required at the process Pk today, the target processing quantity Luk of the product type u is set at 0 (Luk=0). In summary, the following equations hold true.

Luk=Nuk−SKuk(Nuk>SKuk)

Luk=0(Nuk≦SKuk)

Thus, a target processing quantity of each product type at each process Pk is obtained according to the pull production method.

In the present embodiment, a comparison is made between a cumulative target processing quantity and a cumulative quantity actually produced from a starting day. Let us assume that Juk(m) (units) represents the quantity of the product type u actually (or expected) processed on the m-th day from the starting day and that Yuk(m) (units) represents a target processing quantity for the product u on the m-th day from the starting day. A cumulative lead/delay quantity Duk(h) (units) representing any deviation from the plan (target processing quantity) for the processing of the product type u on the h-th day is obtained by:

$$Duk(h) = \sum_{m=1}^{h} Juk(m) - \sum_{m=1}^{h} Yuk(m) = J'uk(h) - Y'uk(h)$$

A lead or delay of processing of each product type is evaluated using a cumulative lead/delay quantity Duk(h), and the processing of each product type is expedited based on the degree of a delay. Thus, even when demand is not smoothed for each product type, management of a forecast and actual production can be carried out in response to demand from a subsequent process. It is therefore possible to keep an initial production plan easily even when various disturbances occur on the production line.

FIG. 17 shows steps for evaluating leads and delays of production of each product type according to the present embodiment. In the present embodiment, it is assumed that the starting day of a monthly plan is January 21 and that today is January 25. The process of interest is a thin film transistor (TFT) process, and there are five product types (models), i.e., 8.0" (012ZZ), 5.0"W(034AA), 7.0"W (022AH), 20.0" (044AS), and 45" (100SF). The description "8.0" (20.0", 45")" indicates a TFT substrate having a diagonal dimension of 8.0 (20.0, 45) inches, and the description "5.0"W (7.0"W)"indicates a wide TFT substrate having a diagonal dimension of 5.0 (7.0) inches. In the line named "plan a" for each product type, a target processing quantity Yuk for each day is input, the quantity being a part of the quantity planned for the month. In the line named "actual result c" for each product type, the actual quantity processed Juk on each of the days from the starting day up to the previous day (January 24) is input. In the line named "Σ(c-a)" for each product type, cumulative lead/delay quantities Duk are input, each of which is a value obtained by accumulating the difference between the quantity actually processed Juk and target processing quantity Yuk of each day since the starting day. A lead or delay of processing of each product type can be evaluated from a cumulative lead/delay quantity Duk. Specifically, when a cumulative lead/delay quantity Duk is negative, the processing of the product type u is delayed by an amount equivalent to the absolute value of the cumulative lead/delay quantity Duk. On the contrary, when the cumulative lead/delay quantity Duk is positive, the processing of the product type u is in advance of the plan by an amount equivalent to the absolute value of the cumulative lead/delay quantity Duk.

For example, the cumulative lead/delay quantity Duk (Σ(c-a)) of the product type 7.0"W on January 21 is +60 because the target processing quantity Yuk (plan a) is 1940 and the quantity actually processed Juk (actual result c) is 2000. Therefore, the processing of the product type 7.0"W on January 21 is in advance of the plan by 60 units. On the contrary, the cumulative lead/delay quantity Duk of the product type 8.0" on January 22 is −16 because the target processing quantity Yuk is 446 and the quantity actually processed Juk is 430. Therefore, the processing of the product type 8.0" on January 22 is delayed by 16 units.

Ninth Embodiment

A method of production control according to a ninth embodiment of the invention will now be described with reference to FIG. 18. The present embodiment addresses a production line which is not smoothed in terms of product types and quantities and in which various disturbances may occur to introduce a deviation between an initial plan and a revised forecast presented when a predetermined period has passed after the planning. In such a case in which it is difficult to follow the initial plan based on only a comparison between actual results and the plan, a delay in processing of each product type is evaluated by comparing a value (a cumulative expected quantity processed) obtained by accumulating actual quantities processed and expected quantities processed after a forecast revision with a cumulative target processing quantity.

Let us assume that the h-th day from the starting point of the plan is the starting day of the revision. Further, a revised forecast is made for the period from the h-th day to the g-th day from the starting point of the plan (h<g). At this time, a cumulative lead/delay quantity Duk(g) representing a deviation of the product type u from the plan on the g-th day from the starting point of the plan is obtained by:

$$Duk(g) = \sum_{m=1}^{h} Juk(m) + \sum_{m=h+1}^{g} Juk(m) - \sum_{m=1}^{g} Yuk(m) = J'uk(h) + J''uk(g) - Y'uk(g)$$

The cumulative lead/delay quantity Duk(g) is used as an evaluation index to allow any deviation between the plan and actual results in the future to be predicted in advance and to thereby allow measures to be taken in advance, which makes it possible to conduct forecast management in response to demands from subsequent processes.

FIG. 18 shows steps for evaluating leads and delays of production of each product type according to the present embodiment. In the present embodiment, it is assumed that a plan is revised on January 25. In the line named "actual result c" on and after the revising day, quantities actually processed (expected quantities processed) Juk after the revision are input. In the line named "Σ(c-a)", cumulative lead/delay quantities (expected cumulative lead/delay quantities) Duk are input, which are values obtained by accumulating differences between the quantities actually processed Juk after the revision and the target processing quantities Yuk since the starting point of the plan. A lead or delay of processing of each product type on and after the revising day can be evaluated from a cumulative lead/delay quantity Duk. Specifically, when a cumulative lead/delay quantity Duk is negative, it is expected that the processing of the product type u will be delayed by an amount equivalent to the absolute value of the cumulative lead/delay quantity Duk. On the contrary, when the cumulative lead/delay quantity Duk is positive, it is expected that the processing of the product type u will be in advance of the plan by an amount equivalent to the absolute value of the cumulative lead/delay quantity Duk.

For example, the cumulative lead/delay quantity Duk (Σ(c-a)) of the product type 7.0"W on January 24 is −80; the target processing quantity Yuk (plan a) for the product type 7.0"W on January 25 is 1047; and the quantity actually processed Juk (actual result c) after the revision on January 25 is 1100. Thus, the cumulative lead/delay quantity Duk on January 25 is −27 (=−80+1100−1047). It is therefore expected that a delay of 27 units will occur in the processing of the product type 7.0"W on January 25.

Tenth Embodiment

A method of production control according to a tenth embodiment of the invention will now be described with reference to FIGS. 19 and 20. In the present embodiment, a comprehensive evaluation is made instead of evaluating each product type separately when forecast revision is conducted as in the ninth embodiment. A plan observance rate Dk(g) is used as an index for a comprehensive evaluation of a revised forecast. Let us assume that there are t kinds of product types u and that Wu represents a weight on a product type u. Then, a plan observance rate Dk(g) is obtained by:

$$Dk(g) = \frac{\sum_{u=1}^{t} Wu\left(\sum_{m=1}^{g} Yuk(m)\right) + \sum_{u=1}^{t} \text{MIN}(0, WuDuk(g))}{\sum_{u=1}^{t} Wu\left(\sum_{m=1}^{g} Yuk(m)\right)}$$

MIN(0, α) assumes the smaller of the values 0 and α. Specifically, MIN(0, α)=0 when a α≧0, and MIN(0, α)=α when α<0. When processing of the product type u is in advance of a plan, since the cumulative lead/delay quantity Duk(g) is positive (Duk(g)>0), MIN(0, Duk(g))=0. When processing of the product type u is behind the plan, since the cumulative lead/delay quantity Duk(g) is negative (Duk(g) <0), MIN(0, Duk(g))=Duk (g) (<0).

Thus, a plan observance rate Dk(g) is obtained by totaling cumulative quantities of all product types with the cumulative lead/delay quantities Duk(g) of product types u behind the plan multiplied with weights Wu on the respective product types u and dividing the result by the total quantity planned in which the weights Wu are reflected.

FIG. 19 shows a first revised forecast, and FIG. 20 shows a second revised forecast. First, as shown in FIG. 19, a total planned quantity for all product types (a total quantity scheduled to be processed) Y (=Σ((a quantity of each product type scheduled to be processed)×(a weight on the product type))) is calculated for each day, and a total cumulative planned quantity from the starting day of the plan (a total cumulative quantity scheduled to be processed) Y' is calculated for each day. In this example, it is assumed that all product types have a weight of 1. For example, the total planned quantity Y on January 21 that is the starting day is 1940 (=1940×1), and the total cumulative planned quantity Y' on the same day is 1940. The total planned quantity Y on January 22 is 2024 (=446×1+698×1+794×1+86×1), and the total cumulative planned quantity Y' on the same day is 3964 (=1940+2024).

Next, the sum D' of the cumulative lead/delay quantities of product types behind the plan in processing (total cumulative delay quantity) (=Σ((the cumulative lead/delay quantities of the product types behind the plan in processing)× (weights on the product types))) is calculated for each day. That is, the total cumulative delay quantity D' is the sum of values that are cumulative lead/delay quantities having negative values multiplied by respective weights. For example, the total cumulative delay quantity D' on January 21 is 0 because there is no product type which is processed behind the plan. On January 22, the processing of three product types 8.0", 5.0"W, and 45" is behind the plan, and the total cumulative delay quantity D' is therefore −28(=−16×1−10×1−2×1).

Next, the plan observance rate of each day is calculated using the total cumulative planned quantity Y' and the total cumulative delay quantity D'. The plan observance rate is calculated from (Y'+D')/Y'. For example, the plan observance rate on January 21 is 100% because the total cumulative planned quantity Y' is 1940 and the total cumulative delay quantity D' is 0. The plan observance rate on January 22 is 99.3% because the total cumulative planned quantity Y' is 3964 and the total cumulative delay quantity D' is −28 (=(3964−28)/3964). For example, plan observance rates for days up to January 28 are calculated according to the steps described above. The plan observance rate on January 28 is 98.7% in the first revised forecast shown in FIG. 19, whereas the plan observance rate on January 28 is 97.3% in the second revised forecast shown in FIG. 20. It will therefore be understood that the first revised forecast with a higher plan observance rate is advantageous. As thus described, the present embodiment makes it possible to make a comprehensive evaluation of a revised forecast by using a plan observance rate as an index for evaluation.

Eleventh Embodiment

A method of production control according to an eleventh embodiment of the invention will now be described with reference to FIGS. 21 and 22. The present embodiment addresses a situation in which there is an assembly line for assembling a plurality of half-finished products or parts to fabricate a product or half-finished product and a plurality of manufacturing lines for manufacturing the plurality of half-finished products or parts to be launched to the assembly line, respectively. A target processing quantity for the assembly line is first calculated according to the pull production method, and target processing quantities for the plurality of manufacturing lines are then calculated according to the pull production method.

It is assumed that P0 represents a launching process of the assembly line; P1 represents a warehousing (launch preparation) process preceding the process P0; Pa2 represents a shipping process of a manufacturing line A that is one of the plurality of manufacturing lines for manufacturing the half-finished products or parts to be launched to the process P0; Pa3 represents a process which directly precedes the process Pa2, the process Pa3 being followed by processes Pa4, Pa5, ..., Pak, ... which are provided in the order listed from the shipping side toward the launching side; Tak (days) represents lead time from the launching of the process Pak up to the shipment at the process P1; Nak (units) represents a total quantity scheduled to be launched from the manufacturing line A to the assembly line since a starting day until after the lead time Tak passes; ηak represents the yield of the process Pak; Sak (units) represents the quantity of work in process at the process Pak; Kak (units) represents an expected quantity completed, which will contribute to the shipment, among the work in process Sak; Sa1 (units) represents the quantity of work in process at the process P1; and Ka1 (units) represents an expected quantity completed, which will contribute to the shipment, among the work in process Sa1.

The expected quantity completed at the process P1 can be calculated by Ka1=Sa1×ηa1. The expected quantity completed at the process Pak (k=2, 3, ... ) can be calculated by Kak=Sak×ηak×ηa(k−1)× ... ×ηa1. Therefore, an expected cumulative quantity completed SKak, which will contribute to warehousing, among work in process which has passed through the process Pk (k=1) and Pak (k=2, 3, ... ) is given by:

$$SKak = \sum_{i=1}^{k-1} Kai = \sum_{i=1}^{k-1} (Sai \times \eta ai \times \eta a(i-1) \times \cdots \times \eta a1)$$

A comparison is made between the total quantity Nak scheduled to be launched until after the lead time Tak passes and the expected cumulative quantity completed SKak. When the total quantity scheduled to be launched Nak is greater than the expected cumulative quantity completed SKak (Nak>SKak), the difference between the total quantity scheduled to be launched Nak and the expected cumulative quantity completed SKak constitutes today's target processing quantity Lak (units) at the process Pak (Lak=Nak−SKak). When the total quantity scheduled to be launched Nak is equal to or smaller than the expected cumulative quantity completed SKak (Nak ≤ SKak), since no processing is required at the process Pak today, the target processing quantity Lak is set at 0 (Lak=0). In summary, the following equations hold true.

*Lak=Nak−SKak(Nak>SKak)*

*Lak=0(Nak≤SKak)*

By way of example, TFT substrates fabricated through a TFT process and color filter (CF) substrates fabricated through a CF process will be referred to as half-finished products in the present embodiment. It is also assumed that liquid crystal display panels are fabricated through a combining line (assembly line) for combining TFT substrates and CF substrates. For simplicity, it is assumed that there is only one product type.

FIG. 21 shows steps for calculating target processing quantities for the combining line according to the present embodiment, and FIG. 22 shows steps for calculating target processing quantities for the TFT process according to the present embodiment. As shown in FIG. 21, the combining line of the present embodiment includes processes P06, P05, P04, P03, P02, and P01. The process P06 is a launching process, and the process P01 is a process which directly precedes storage in a shipping warehouse. In the present embodiment, it is not essential that target processing quantities are set for every process. Specifically, there is no need for setting any particular target processing quantity for a process having a surplus in production capacity because the process is only required to process work in process delivered from the preceding process in a dependent manner on a simple first-in first-out basis. In the present embodiment, it is assumed that the processes P01, P03, and P6 are processes for which target processing quantities are to be set and that the processes P02, P04, and P5 are dependent processes for which no target processing quantity is required to be set. It is assumed that all of the processes have a yield $\eta$ of 100%. It is also assumed that lead time from the completion of the process P03 (process P03out) directly preceding the process P02 up to the completion of the process P01 (process P01out; warehousing) is just one day; lead time from the completion of the process P06 (process P06out) until the completion of the process P01 (process P01out) is two days.

First, a description will be made on steps for calculating target processing quantities (target launching quantities) for the process P06 from target processing quantities (scheduled warehousing quantities) for the combining line using the pull production method. As shown in FIG. 21, target processing quantities L01 for eight days starting today are set for the process P01 (line (1) in FIG. 21). For example, today's target processing quantity L01 for the process P01 is set at 900, and target processing quantity L01 for the process P01 of tomorrow (one day later) is set at 910. The daily processing capacity of the process P01 covers work in process at the P01 and work in process at the process P02 preceding the same, and the daily processing capacity of the process P03 covers work in process at the P03 and work in process at the processes P04 and P05 preceding the same. The quantity of work in process (represented by S0(1-2)) at the processes P01 and P02 is 1200 this morning (line (2) in FIG. 21). The quantity of work in process (represented by S0(3-5)) at the processes P03 to P05 is 700 this morning (line (4) in FIG. 21).

Today's target processing quantity L03 for the process P03 is now obtained. In order to process the today's target processing quantity L01 (=900 units) plus the tomorrow's target processing quantity L01 (=910 units) at the process P01, a predetermined quantity of work in process must be fed from the process P03 to the process P02 before tomorrow morning. The quantity required to be processed at the process P03 today for this purpose is a value obtained by subtracting the today's work-in-process quantity S0(1-2) at the processes P01 and P02 from the sum of the target processing quantities L01 of today and tomorrow (610 (=900+910−1200). Thus, the target processing quantity L03 for the process P03 of today (from this morning until tomorrow morning) is 610 which is equal to the quantity required to be processed today at the process P03 (line (3) in FIG. 21). The today's target processing quantity L03 for the process P03 is the quantity to be processed at process P01 tomorrow (from tomorrow morning until the morning of the day after tomorrow). In FIG. 21, This is indicated by the arrow in a broken line extending from the tomorrow's target processing quantity L01 for the process P01 toward the today's target processing quantity L03 for the process P03.

Next, tomorrow's work-in-process quantity (expected work-in-process quantity) S0(1-2) at the processes P01 and P02 and tomorrow's target processing quantity L03 for the process P03 are obtained. The work-in-process quantity S0(1-2) at the processes P01 and P02 expected tomorrow morning is a value obtained by subtracting the today's target processing quantity L01 for the process P01 from the today's work-in-process quantity S0(1-2) at the processes P01 and P02 and adding the today's target processing quantity L03 for the process P03 to the result. That is, the tomorrow's expected work-in-process quantity S0(1-2) at the processes P01 and P02 is 910 (=1200−900+610). The quantity required to be processed tomorrow at the process P03 is a value obtained by subtracting the tomorrow's expected work-in-process quantity S0(1-2) at the processes P01 and P02 from the sum of the target processing quantities L01 for the process P01 of tomorrow and the day after tomorrow (1200(=910+1200−910) units). Thus, the tomorrow's target processing quantity L03 for the process P03 is 1200 which is equal to the quantity required to be processed at the process P03 tomorrow. The tomorrow's target processing quantity L03 for the process P03 is the quantity to be processed at the process P01 the day after tomorrow. In FIG. 21, this is indicated by the arrow in a broken line extending from the target processing quantity L01 to be processed at the process P01 the day after tomorrow toward the tomorrow's target processing quantity L03 for the process P03.

A work-in-process quantity S0(1-2) expected at the processes P01 and P02 in the morning of the day after tomorrow is a value obtained by subtracting the tomorrow's target processing quantity L01 for the process P01 from the tomorrow's expected work-in-process quantity S0(1-2) at the processes P01 and P02 and adding the tomorrow's target processing quantity L03 for the process P03 to the result (1200(=910−910+1200) units). It is possible to similarly obtain work-in-process quantities S0(1-2) expected on the third through seventh days from today at the processes P01 and P02 and to obtain target processing quantities L03 to be processed at the process P03 on the second through sixth days from today. It is also possible to similarly obtain the quantities of work in process (expected work-in-process quantities) S0(3-5) at the processes P03 to P05 for the period from tomorrow until the sixth day (line (4) in FIG. 21) and target processing quantities L06 of the process P06 for the period from today until the fifth day (line (5) in FIG. 21).

Next, target processing quantities for the TFT process for fabricating TFT substrates to be launched to the combining line are calculated from target processing quantities L06 for the launching process P06 of the combining line. As shown in FIG. 22, an intermediate warehouse process P1 for buffering TFT substrates and CF substrates which are half-finished products is provided immediately before the process P06. Target processing quantities (target launching quantities) L06 for the process P06 are equal to target processing quantities (quantity scheduled to be shipped) L1 for the process P1 (line (1) in FIG. 22). Let us assume that the process P06 is a bottleneck of the entire production line of the factory and that a buffer (in-process inventories) for allowing the process P06 to be run to its maximum capacity is concentrated at the process P01. Thus, the lead time of the process P1 is three days. The TFT process includes processes Pa6, Pa5, Pa4, Pa3, and Pa2. All of the processes have a yield $\eta$ of 100%. Lead time from the completion of the process Pa2 (Pa2out) until the completion of the process P1 (P1out) is four days, and lead time from the completion of the process Pa6 (Pa6out) until the completion of the process P1 (P1out) is five days. For example, the quantity of work in process at the process P1 this morning (S(1)) is 3000 units (line (2) in FIG. 22), and the quantity of work in process at the processes Pa3 to Pa5 this morning (Sa(3-5) is 700 units (line (4) in FIG. 22).

The process Pa2 preceding the process P1 is a shipping process for shipping TFT substrates to the intermediate warehouse. The today's quantity required to be processed at the process Pa2 is a value obtained by subtracting today's work-in-process quantity S(1) at the process P1 from the sum of the target processing quantities L06 for the process P06 (=the target processing quantities L1 for the process P1) from today until the third day counted from today (the lead time of the process P1) (1210(=1110+1150+950+1000−3000) units). Thus, today's target processing quantity La2 for the process Pa2 is 1210 which is equal to the quantity required to be processed at the process Pa2 today (line (3) in FIG. 22).

The quantity of work in process at the process P1 of tomorrow (expected work-in-process quantity) S(1) is a value obtained by subtracting today's target processing quantity L1 for the process P1 from the today's work-in-process quantity S(1) for the process P1 and adding today's target processing quantity La2 for the process Pa2 to the result (3100(=3000−1110+1210) units). The quantity required to be processed at the process Pa2 tomorrow or the target processing quantity La2 is a value obtained by subtracting tomorrow's work-in-process quantity S(1) at the process P1 from the sum of the target processing quantities L06 for the process P06 from tomorrow until the fourth day counted from today (1150(=1150+950+1000+1150−3100) units). It is possible to similarly obtain work-in-process quantities S(1) at the process P1 on the second day and afterward and target processing quantities La2 for the process Pa2 on the second day and afterward. It is also possible to similarly obtain work-in-process quantities Sa(3-5) at the processes Pa3 to Pa5 for tomorrow and afterward (line (4) in FIG. 22) and target processing quantities La6 for the process Pa6 for today and afterward (line (5) in FIG. 22). Target processing quantities for the CF process for fabricating other half-finished products can be obtained by setting the yield, the lead time, and the quantity of work in process of each process in the same way as shown in FIG. 22.

According to the present embodiment, in a production line including an assembly line for assembling a plurality of half-finished products or parts to fabricate products or half-finished products and a plurality of manufacturing lines for manufacturing the half-finished products or parts respectively, target processing quantities can be easily calculated using the pull production method.

Twelfth Embodiment

A method of production control according to a twelfth embodiment of the invention will now be described with reference to FIG. 23. In the present embodiment, when a process Pk is a bottleneck process for which a setup change takes time, target processing quantities are adjusted to increase the size of a processing batch of one product type to a certain degree in order to keep the number of setup changes equal to or smaller than a predetermined number of times. Specifically, when a quantity required to be processed cannot be achieved without decreasing the number of setup changes, in the present embodiment, target processing quantities Luk of product types u to be processed at the process Pk are obtained for each day, and target processing quantities of one of the product types are thereafter moved up and combined with the target processing quantity of the same product type on another day to increase the quantity of work in process which can be continuously processed. Thus, the required quantity can be processed at the process Pk with the number of setup changes decreased. For this purpose, an intermediate warehousing process or work-in-process buffer is provided before the process Pk, and lead time from the intermediate warehouse or work-in-process buffer up to a process P1 is set by increasing the lead time from the process Pk by the number of days to be moved up.

Figures 23, 23A:
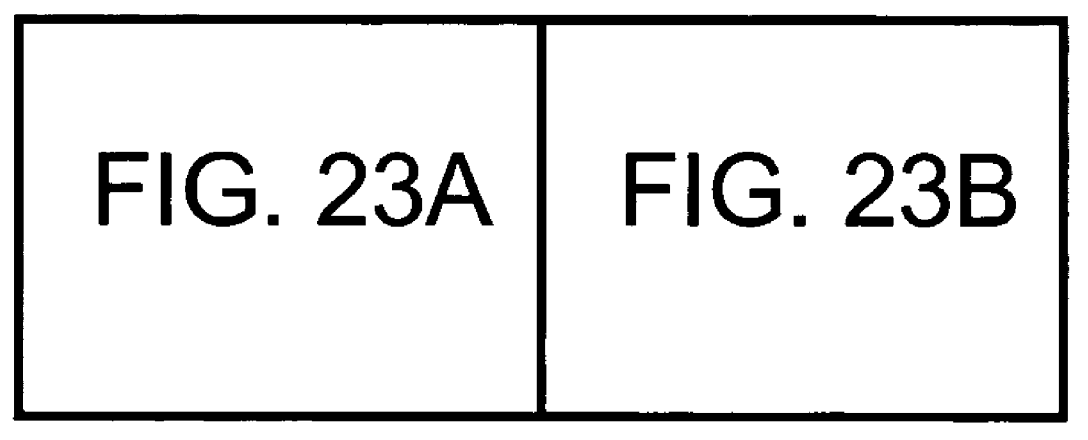
Figure 23B:
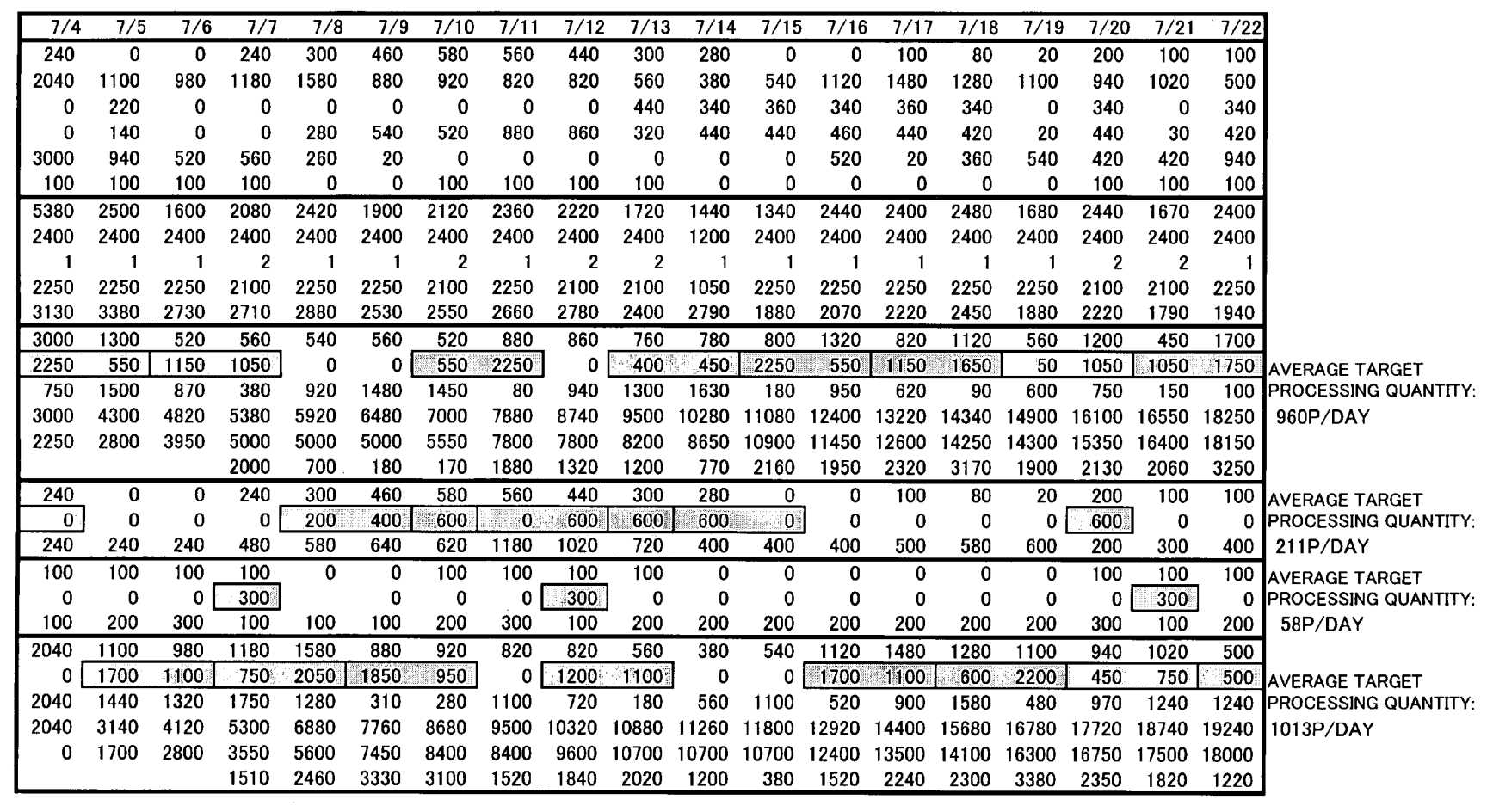

FIG. 23 shows steps for adjusting target processing quantities according to the embodiment. The column of a day of item (A) of FIG. 23 shows a target processing quantity for each product type at the process P(k+1) that precedes the process Pk. The target processing quantities for the process P(k+1) are obtained by applying the pull production method from the shipping side. An intermediate warehouse (or work-in-process buffer) is provided between the process Pk and the process P(k+1). It is assumed that lead time of the warehouse process for a main product type is three days and the yield of the process is 100%. Therefore, the item (A) not only shows the target processing quantities for the process P(k+1) but also shows target processing quantities for the process Pk to be processed three days later. Among a plurality of product types processed at the process Pk, product types B, C1, C2, and C3 are main product types. Since the product types C1, C2, and C3 can be processed in the same batch at the process Pk without making a setup change, the product types C1, C2, and C3 will be referred to as "a product group C". The optimum processing batch for the product type B and the product group C at the process Pk is about 2800 P from the viewpoint of utilization of materials. They can obviously be processed even if there is an increase or decrease from the processing batch of 2800 P. Hereinafter, the optimum size of a processing batch will be referred to as "optimum batch size". Product types A and D are items produced in small quantities. The optimum batch size for the product type A at the process Pk is 600 P, and the optimum batch size for the product type D is 300 P. A target quantity for a main product type specified to be processed at the process Pk three days later is not necessarily required to be processed three days later, and what is required is that the product type will be processed within the period from the current day until three days later.

The column of a day of the item (B) in FIG. 23 shows a total target processing quantity for all product types to be processed at three days later at the process Pk (line (1)) and a total quantity that can be processed at the process Pk in each day (line (2)). The total processable quantity is 2400 P/day. The total processable quantity is 1200 P on July 14 when maintenance is carried out in one half of the day. When processing is changed to accommodate a product type other than the product types of the product group C, a setup change is required. A total scheduled processing quantity which can be actually processed at the process Pk (line (4)) is decreased by 150 P when one setup change is made (line(3)). Therefore, the actual total scheduled processing quantity becomes 2250 P on a day when one setup change is made, and the actual total scheduled processing quantity becomes 2100 P on a day when two setup changes are made. Let us assume that processing is performed at the process Pk to meet the total scheduled processing quantity each day. Then, any quantity remaining to meet the cumulative scheduled processing quantity of the entire product types on a day at the process Pk (line (5)) equals (the remaining quantity to meet the cumulative scheduled processing quantity on the previous day)− (the total scheduled processing quantity on the day)+(the target processing quantity on the day). In FIG. 23, the unprocessed part of cumulative target processing quantity up to July 3 is added to the total target processing quantity on July 4.

The column of a day of the item (C) in FIG. 23 shows a target processing quantity of the product group C to be processed at the process Pk three days later (line (1)), a scheduled processing quantity of the day (line (2)), a cumulative quantity remaining to meet the target processing quantity (line (3)), a cumulative target processing quantity which is an accumulation of the target processing quantities of each preceding day (line (4)), a cumulative scheduled processing quantity which is an accumulation of the scheduled processing quantity of each preceding day (line (5)), and a check value for a delay of three days or more, which is a value obtained by subtracting the cumulative target processing quantity of three days ago from the cumulative scheduled processing quantity of the day (line (6)). When the check value for a delay of three days or more is negative (<0), it will not be possible to process the target processing quantity until three days later, and the lead time of three days of the intermediate warehouse will not be met. The column of a day of the item (D) in FIG. 23 shows a target processing quantity of the product type A to be processed at the process Pk three days later (line (1)), a scheduled processing quantity of the day (line (2)), and a cumulative quantity remaining to meet the target processing quantity (line (3)). The column of a day of the item (E) in FIG. 23 shows a target processing quantity of the product type D to be processed at the process Pk three days later (line(1)), a scheduled processing quantity of the day (line (2)), and a cumulative quantity remaining to meet the target processing quantity (line (3)). The column of a day of the item (F) in FIG. 23 shows a target processing quantity of the product type B to be processed at the process Pk three days later (line (1)), a scheduled processing quantity of the day (line (2)), a cumulative quantity remaining to meet the target processing quantity (line (3)), a cumulative target processing quantity which is an accumulation of the target processing quantities of each preceding day (line (4)), a cumulative scheduled processing quantity which is an accumulation of the scheduled processing quantity of each preceding day (line (5)), and a check value for a delay of three days or more, which is a value obtained by subtracting the cumulative target processing quantity of three days ago from the cumulative scheduled processing quantity of the day (line (6)).

Any delay of three days or more is prevented for the product group C and the product type B which are main products. That is, the check value for a delay of three days or more is prevented from becoming negative. In the case of the product type A or D which is a product type produced in small quantities, when a quantity remaining to meet a processing target becomes equal to or greater than the optimum batch size on a certain day, the product type is launched in a scheduled processing quantity which is equal to the optimum batch size on the next day. However, it may be required to divide the scheduled processing quantity so as to process it on two days because of the condition that the quantity should not exceed a total scheduled processing quantity when totaled with scheduled processing quantities of other product types. However, the rule that the product type A is to be launched on the day after a day when the target processing quantity for the product type equals or exceeds the optimum batch size is lower in priority than the rule that any delay of three days or more must be avoided for the main product types and the rule that the product type D is to be launched on the day after a day when the target processing quantity for the product type equals or exceeds the optimum batch size. Therefore, the product type A may not be launched even on a day when the remaining quantity to meet the processing target is in the excess of the optimum batch size of 600 P.

Steps for determining scheduled processing quantities will now be described. First, the scheduled processing quantity for July 4 is determined. In this example, since the product type A is processed on July 3, the product group C is processed on July 4 after making a setup change. It is assumed that the scheduled processing quantity for the product group C is 2250 P which is the same value as the total scheduled processing quantity. Since the target processing quantity is 3000 P, the quantity of the product group C remaining to meet the processing target is 750 P.

Next, the scheduled processing quantity for July 5 is determined. The processing of the product group C is carried on from the previous day to process 550 P (=2800−2250) taking the optimum batch size (2800 P) of the product group C into consideration. A setup change is thereafter made to process the product type B. The scheduled processing quantity for the product type B is set at 1700 P which is obtained by subtracting the scheduled processing quantity (550 P) for the product group C from the total scheduled processing quantity (2250 P). The quantity of the product group C remaining to meet the processing target becomes 1500 P because the cumulative target processing quantity of the product group C is 4300 P and the cumulative scheduled processing quantity of the same is 2800 P. The quantity of product type B remaining to meet the processing target becomes 1440 P because the cumulative target processing quantity of the product type B is 3140 P and the cumulative scheduled processing quantity of the same is 1700 P.

Next, the scheduled processing quantity for July 6 is determined. The processing of the product type B is carried on from the previous day to process 1100 P (=2800−1700) taking the optimum batch size (2800 P) of the product type B into consideration. A setup change is thereafter made. The product group C is then processed because neither product type A nor product type D, which is a product type in small quantities, satisfy the condition that the quantity remaining to meet the processing target on the previous day should be equal to or greater than the optimum batch size. The scheduled processing quantity for the product group C is set at 1150 P which is obtained by subtracting the scheduled processing quantity (1100 P) for the product type B from the total scheduled processing quantity (2250 P). The quantity of the product type B remaining to meet the processing target becomes 1320 P because the cumulative target processing quantity of the product type B is 4120 P and the cumulative scheduled processing quantity of the same is 2800 P. The quantity of the product group C remaining to meet the processing target becomes 870 P because the cumulative target processing quantity of the product group C is 4820 P and the cumulative scheduled processing quantity of the same is 3950 P. Since the quantity of the product type D remaining to meet the processing target (300 P) agrees with the optimum batch size of the product type D (300 P), the product type D will be processed next day (July 7).

Next, the scheduled processing quantity for July 7 is determined. The processing of the product group C is carried on from the previous day to process 1050 P. Although it is desirable to set the scheduled processing quantity of the product group C for July 7 at 1650 P when only the optimum batch size of the same is taken into consideration, the quantity of the product group C remaining to meet the processing target is far short of 1650. Under the circumstance, the scheduled processing quantity of the product group C for July 7 is set at 1050 P based on a condition that the next processing batch of the product group C is to meet the optimum batch size. The check value for a delay of three days or more is 2000 P (=5000−3000) because the cumulative scheduled processing quantity of the product group C on July 7 is 5000 P and the cumulative target processing quantity of three days before (July 4) is 3000 P. A setup change is subsequently made to process the product type D. The scheduled processing quantity of the product type D is set at 300 P which is equal to the optimum batch size. The quantity of the product type D remaining to meet the processing target becomes 100 P (=300+100−300) because the quantity of the product type D remaining to meet the processing target on the previous day (July 6) is 300 P; the target processing quantity of July 7 is 100 P; and the scheduled processing quantity for July 7 is 300 P. Another setup change is subsequently made to process the product type B. The scheduled processing quantity of the product type B is set at 750 P which is obtained by subtracting the scheduled processing quantity (1050 P) of the product group C and the scheduled processing quantity (300 P) of the product type D from the total scheduled processing quantity (2100 P). The check value for a delay of three days or more is 1510 P (=3550−2040) because the cumulative scheduled processing quantity of the product type B on July 7 is 3550 P and the cumulative target processing quantity of three days ago (July 4) is 2040 P.

Next, the scheduled processing quantity for July 8 is determined. The processing of the product type B is carried on from the previous day to process 2050 P (=2800−750) taking the optimum batch size (2800 P) of the product type B into consideration. A setup change is subsequently made to process the product type A. The scheduled processing quantity of the product type A is set at 200 P which is obtained by subtracting the scheduled processing quantity (2050 P) of the product type B from the total scheduled processing quantity (2250 P).

Next, the scheduled processing quantity for July 9 is determined. The processing of the product type A is carried on from the previous day to process 400 P (=600−200) taking the optimum batch size (600 P) of the product type A into consideration. A setup change is subsequently made to process the product type B. The scheduled processing quantity of the product type B is set at 1850 P which is obtained by subtracting the scheduled processing quantity (400 P) of the product type A from the total scheduled processing quantity (2250 P).

Similar steps are then taken to determine a scheduled processing quantity for each product type on each of days starting July 10. In the present embodiment, a required quantity can be processed at a process Pk by moving up processing targets to decrease the number of setup changes even when the process Pk, for which a setup change takes a long time, constitutes a bottleneck process or restricted process.

A description will now be made on how to determine the lead time of the intermediate warehouse process (or work-in-process buffer). The average target processing quantity for the product group C is 960 P/day, and the average target processing quantity for the product type B is 1013 P/day. Therefore, in order to form processing batches of the product group C and the product type B with the optimum batch size (2800 P), work in process for those product types must be accumulated in target processing quantities for 2.9 (which is substantially equal to 2800/960) days and 2.8 (which is substantially equal to 2800/1013) days, respectively. Thus, an average number of days required for accumulating work in process of a main product type in the optimum batch size or a number of days obtained by counting any fraction of the average number of days as a unit is set as the lead time of a warehouse process for the product type. In the present embodiment, the lead time of the intermediate warehouse process is three days. The average target processing quantities for the product types A and D, which are product types processed in small quantities, are 211 P/day and 58 P/day, respectively. Therefore, the average number of days required for accumulating work in process in the optimum batch size is 2.8 (which is substantially equal to 600/211) days for the product type A and 5.2 (which is substantially equal to 300/58) days for the product type D. Thus, the lead time of the intermediate warehouse process is differently set for each product type.

The methods of production control according to the first through the twelfth embodiment described above may be applied to methods of manufacturing electronic apparatus such as liquid crystal displays and semiconductor devices and other industrial products. The throughput of a production line of active matrix liquid crystal displays having TFT's could be improved by 10% as a result of the application of an embodiment of the invention as described above.

What is claimed is:

1. A method of production control for a production line including a plurality of processes, comprising the step of obtaining a target processing quantity Lk for a process Pk from:

$$Lk = Nk - SKk (Nk > SKk)$$

$$Lk = 0 (Nk \leq SKk)$$

where the processes are represented by Pn (n=1, 2, ..., k−1, k, ...) in the order of their closeness to warehousing; Nk represents a total quantity scheduled to be warehoused from a day as a starting point until after lead time Tk from the process Pk up to the warehousing passes; and SKk represents an expected cumulative quantity completed, which will contribute to the warehousing, among work in process which has passed through the process Pk.

2. A method of manufacturing industrial products using a production line including a plurality of processes, employing the method of production control according to claim 1.

3. A method of production control according to claim 1, wherein the expected cumulative quantity completed SKk is obtained from:

$$SKk = \sum_{i=1}^{k-1} (Si \times \eta i \times \eta(i-1) \times \cdots \times \eta 1)$$

where Sk represents the quantity of work in process at the process Pk, and ηk represents the yield of the process Pk.

4. A method of production control according to claim 1, wherein, the target processing quantity Lk is sequentially obtained for the processes starting with the process closest to warehousing.

5. A method of production control for a production line including a plurality of processes, comprising the steps of obtaining a minimum target processing quantity Lkmin for a process Pk from:

$$Lk\min = Nk - SKk \, (Nk > SKk)$$

$$Lk\min = 0 \, (Nk \leq SKk)$$

where the processes are represented by Pn (n=1, 2, ..., k−1, k, ...) in the order of their closeness to warehousing; the process Pk is a bottleneck process or restricted process; Nk represents a total quantity scheduled to be warehoused from a day as a starting point until after lead time Tk from the process Pk up to the warehousing passes; and SKk represents an expected cumulative quantity completed, which will contribute to the warehousing, among work in process which has passed through the process Pk, calculating a surplus capacity of the process Pk by comparing the minimum target processing quantity Lkmin and a maximum processing capacity Mk of the process Pk, and obtaining a target processing quantity Lk for the process Pk by adding a quantity available with the surplus capacity to the minimum target processing quantity Lkmin.

6. A method of production control according to claim 5, comprising the steps of:

comparing the target processing quantity Lk and a quantity SMk of work in process that can be processed at the process Pk in a unit period; and correcting the target processing quantity Lk to set the value of the processable work-in-process quantity SMk as the target processing quantity Lk if the target processing quantity Lk is greater than the processable work-in-process quantity SMk.

7. A method of production control according to claim 5, comprising the steps of:

substituting the process Pk for the process P1 after the target processing quantity Lk is obtained; and sequentially obtaining target processing quantities for processes located closer to the launching side of the production line than the substituted process P1.

8. A method of production control according to claim 7, wherein the target processing quantities for the processes closer to the launching side than the process P1 are obtained using the method of production control according to claim 1.

9. A method of production control according to claim 7, wherein when the production line includes a plurality of bottleneck processes or restricted processes, target processing quantities for the bottleneck processes or restricted processes are sequentially obtained starting with the process closest to warehousing.

10. A method of production control according to claim 5, wherein when the target processing quantity Lk for the process Pk is greater than a target processing quantity L1 for the process P1, the difference between the target processing quantity Lk and the target processing quantity L1 is accumulated in a pre-shipment warehouse provided immediately after the process P1.

11. A method of production control according to claim 9, wherein when the target processing quantity of one of the plurality of bottleneck processes or restricted processes is greater than the target processing quantity of another bottleneck process or restricted process closer to the warehousing side, the difference between the bottleneck process or restricted process closer to the launching side and the bottleneck process or restricted process closer to the warehousing side is accumulated in an intermediate warehouse provided between the bottleneck process or restricted process closer to the launching side and the bottleneck process or restricted process closer to the warehousing side.

12. A method of production control according to claim 10, wherein the quantity of work in process on the entire production line including the warehouse or the quantity of work in process in each of a plurality of divisional units of the production line is controlled such that it will not exceed a predetermined value.

13. A method of production control for a production line including a plurality of processes and producing a plurality of product types, comprising the step of obtaining a target processing quantity Luk for a product type u at a process Pk from:

$$Luk = Nuk - SKuk \, (Nuk > SKuk)$$

$$Luk = 0 \, (Nuk \leq SKuk)$$

where the processes are represented by Pn (n=1, 2, ..., k−1, k, ...) in the order of their closeness to warehousing; Nuk represents a total quantity scheduled to be warehoused from a day as a starting point until after lead time Tuk for the product type u from the process Pk up to the warehousing passes; and SKuk represents a cumulative quantity of the product type u expected to be completed, which will contribute to warehousing, among work in process which has passed through the process Pk.

14. A method of production control according to claim 13, wherein the expected cumulative quantity completed SKuk of the product type u is obtained from:

$$SKuk = \sum_{i=1}^{k-1} (Sui \times \eta ui \times \eta u(i-1) \times \cdots \times \eta u1)$$

where Suk represents the quantity of work in process of the product type u at the process Pk, and ηuk represents the yield of the product type u at the process Pk.

15. A method of production control according to claim 13, comprising the steps of obtaining a cumulative lead/delay quantity Duk(h) of the product type u at the process Pk on the h-th day from the starting day from:

$$Duk(h) = \sum_{m=1}^{h} Juk(m) - \sum_{m=1}^{h} Yuk(m)$$

where Juk(m) represents the actual quantity of the product type u processed at the process Pk on the m-th day from the starting day, and Yuk(m) represents a target processing quantity of the product type u for the process Pk on the m-th day, and evaluating a lead or delay of processing of each product type at the process Pk based on the cumulative lead/delay quantity Duk(h).

16. A method of production control for a production line including a plurality of processes and producing a plurality of product types, comprising the steps of:

obtaining a cumulative lead/delay quantity Duk(g) of a product type u at a process Pk on the g-th day from the starting day of a plan from:

$$Duk(g) = \sum_{m=1}^{h} Juk(m) + \sum_{m=h+1}^{g} Juk(m) - \sum_{m=1}^{g} Yuk(m)$$

where a plan revision is conducted starting with the h-th day from the starting day of the plan; a forecast is revised for the period from the h-th day up to the g-th day from the starting day of the plan; the processes are represented by Pn (n=1, 2, . . . , k−1, k, . . . ) in the order of their closeness to warehousing; Juk(m) represents the actual processed quantity of the product type u at the process Pk on the m-th day; and Yuk(m) represents a target processing quantity for the product type u at the process Pk on the m-th day, and forecasting a lead or delay of processing of each product type at the process Pk in the future based on the cumulative lead/delay quantity Duk(g).

17. A method of production control according to claim 16, comprising the steps of obtaining a plan observance rate Dk(g) of t product types as a whole at the process Pk on the g-th day from:

$$Dk(g) = \frac{\sum_{u=1}^{t} Wu\left(\sum_{m=1}^{g} Yuk(m)\right) + \sum_{u=1}^{t} \text{MIN}(0, WuDuk(g))}{\sum_{u=1}^{t} Wu\left(\sum_{m=1}^{g} Yuk(m)\right)}$$

(MIN(0, α) assuming the smaller of the values 0 and α) where Wu represents a weight on the product type u, and forecasting a lead or delay of the entire processing at the process Pk in the future based on the plan observance rate Dk(g).

18. A method of production control for a production line including an assembly line for assembling a plurality of half-finished products or parts to fabricate a product or half-finished product and a plurality of manufacturing lines for manufacturing the plurality of half-finished products or parts, respectively, comprising the step of obtaining a target processing quantity Lak for a process Pak from:

Lak=Nak−SKak(Nak>SKak)

Lak=0(Nak≦SKak)

where P0 represents a launching process of the assembly line; P1 represents a warehouse process preceding the process P0; Pa2 represents a shipping process of a manufacturing line A that is one of the plurality of manufacturing lines; processes of the manufacturing line A are represented by Pan (n=3, 4, . . . , k, . . . ) in the order of their closeness to shipment; Nak represents a total quantity scheduled to be launched from the manufacturing line A since the starting day until after the lead time Tak for the processes Pak through P1 passes; and SKak represents an expected cumulative quantity completed, which will contribute to the shipment from the process P1, among work in process which has passed through the process Pak.

19. A method of production control according to claim 18, wherein the expected cumulative quantity completed SKak is obtained from:

$$SKak = \sum_{i=1}^{k-1} (Sai \times \eta ai \times \eta a(i-1) \times \cdots \times \eta a1)$$

where Sak represents the quantity of work in process at the process Pk, and ηak represents the yield of the process Pk.

20. A method of production control according to claim 13, wherein when the process Pk is a bottleneck process or restricted process for which a setup change takes time, targets for processing are moved up after the target processing quantity Luk for the product type u is obtained for each day to increase the size of a processing batch of the product type u which can be continuously processed, thereby decreasing the number of setup changes.

21. A method of production control according to claim 20, wherein an intermediate warehouse process or work-in-process buffer is provided before the process Pk and wherein lead time for the product type u from the intermediate warehouse process or work-in-process buffer until the warehousing is set by adding the number of days to be moved up to the lead time Tuk.

22. A method of production control according to claim 21, wherein the lead time for the product type u from the intermediate warehouse process or work-in-process buffer until the warehousing is an average number of days required for accumulating work in process of the product type u in an optimum batch size at the process Pk or a number of days obtained by counting any fraction of the average number of days as a unit.

* * * * *